(12) United States Patent
Kaule et al.

(10) Patent No.: US 8,778,481 B2
(45) Date of Patent: Jul. 15, 2014

(54) SECURITY ELEMENT AND METHOD FOR THE PRODUCTION THEREOF

(75) Inventors: Wittich Kaule, Emmering (DE); Manfred Heim, Munich (DE); Marius Dichtl, Munich (DE); Winfried Hoffmuller, Bad Tolz (DE)

(73) Assignee: Giesecke & Devrient GmbH, Munich (DE)

( * ) Notice: Subject to any disclaimer, the term of this patent is extended or adjusted under 35 U.S.C. 154(b) by 1179 days.

(21) Appl. No.: 11/816,514

(22) PCT Filed: Feb. 10, 2006

(86) PCT No.: PCT/EP2006/001169
§ 371 (c)(1),
(2), (4) Date: Aug. 16, 2007

(87) PCT Pub. No.: WO2006/087138
PCT Pub. Date: Aug. 24, 2006

(65) Prior Publication Data
US 2008/0160226 A1    Jul. 3, 2008

(30) Foreign Application Priority Data

Feb. 18, 2005  (DE) .......................... 10 2005 007 749
Jun. 17, 2005  (DE) .......................... 10 2005 028 162

(51) Int. Cl.
| | |
|---|---|
| *B32B 3/00* | (2006.01) |
| *B32B 7/00* | (2006.01) |
| *B32B 15/00* | (2006.01) |
| *B42D 15/10* | (2006.01) |
| *B42D 15/00* | (2006.01) |

(52) U.S. Cl.
CPC ..................................... *B42D 15/00* (2013.01)
USPC ............ 428/195.1; 428/209; 283/72; 283/91; 359/619

(58) Field of Classification Search
CPC .......... B41M 3/148; B44F 1/045; B44F 1/10; G02B 27/06; G02B 27/2214; G07D 7/0013; B42D 15/0013; B42D 15/002; B42D 15/10; B42D 2035/20; B42D 2035/28; G03H 1/0011; G03H 1/0244; G03H 2001/043
USPC ................ 70/312; 428/195.1, 209, 207, 156; 359/619; 283/72, 91, 85
See application file for complete search history.

(56) References Cited

U.S. PATENT DOCUMENTS

| | | | |
|---|---|---|---|
| 4,183,989 A | 1/1980 | Tooth | |
| 4,184,700 A * | 1/1980 | Greenaway | ..................... 283/91 |

(Continued)

FOREIGN PATENT DOCUMENTS

| | | |
|---|---|---|
| DE | 10044465 | 3/2002 |
| DE | 10226114 | 7/2003 |

(Continued)

OTHER PUBLICATIONS

Hutley M.C. et al., "The moire magnifier," Pure Appl. Opt. 3:133-142, 1994.

(Continued)

*Primary Examiner* — Mark Ruthkosky
*Assistant Examiner* — Laura C Powers
(74) *Attorney, Agent, or Firm* — Lathrop & Gage LLP

(57) ABSTRACT

The present invention relates to a security element for protecting valuable articles, having a first and a second authenticating feature. The first authenticating feature comprises a first arrangement having a plurality of focusing elements present in a first grid, and a second arrangement having a plurality of microscopic structures present in a second grid. Here, the first and second arrangement are disposed in such a way that the microscopic structures of the second arrangement are seen magnified when viewed through the focusing elements of the first arrangement. The second authenticating feature is machine and/or visually verifiable and is not influenced by the first arrangement of the first authenticating feature.

23 Claims, 13 Drawing Sheets

(56) References Cited

U.S. PATENT DOCUMENTS

Figure 1:
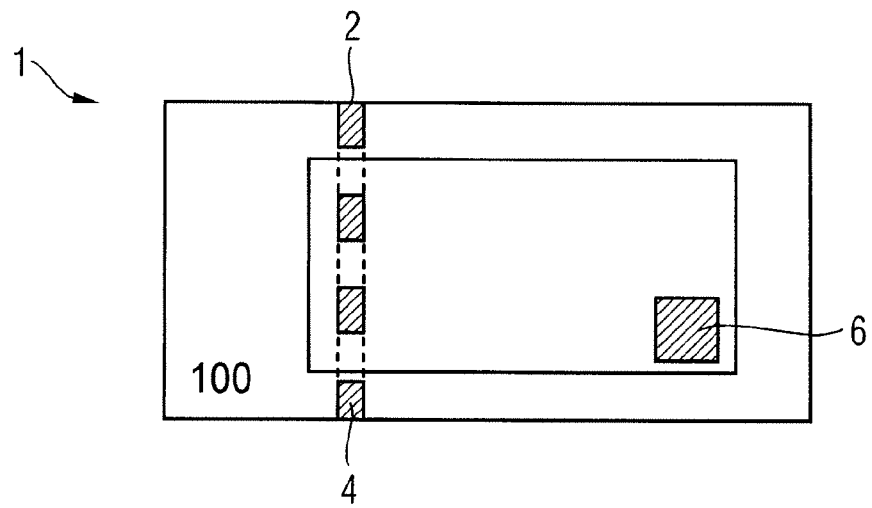

| | | | |
|---|---|---|---|
| 4,758,296 A | | 7/1988 | McGrew |
| 4,892,336 A | | 1/1990 | Kaule et al. |
| 5,465,301 A | | 11/1995 | Jotcham |
| 5,639,126 A | | 6/1997 | Dames et al. |
| 5,712,731 A | * | 1/1998 | Drinkwater et al. ......... 359/619 |
| 5,876,068 A | | 3/1999 | Schneider et al. |
| 6,381,071 B1 | * | 4/2002 | Dona et al. .................... 359/626 |
| 2002/0014967 A1 | | 2/2002 | Crane et al. |
| 2002/0018430 A1 | | 2/2002 | Heckenkamp et al. |
| 2003/0179364 A1 | | 9/2003 | Steenblik et al. |
| 2003/0193183 A1 | | 10/2003 | Taylor et al. |
| 2004/0100707 A1 | | 5/2004 | Kay et al. |
| 2005/0104364 A1 | * | 5/2005 | Keller et al. .................... 283/72 |
| 2005/0170259 A1 | | 8/2005 | Holmes |
| 2005/0180020 A1 | * | 8/2005 | Steenblik et al. ............. 359/626 |
| 2007/0165182 A1 | | 7/2007 | Hoffmuller et al. |
| 2007/0211238 A1 | | 9/2007 | Hoffmuller et al. |
| 2007/0216518 A1 | | 9/2007 | Hoffmuller |
| 2007/0229928 A1 | | 10/2007 | Hoffmuller et al. |
| 2007/0241553 A1 | | 10/2007 | Heim et al. |
| 2007/0246933 A1 | | 10/2007 | Heim et al. |
| 2007/0274559 A1 | | 11/2007 | Depta et al. |
| 2008/0014378 A1 | | 1/2008 | Hoffmuller et al. |
| 2008/0054621 A1 | | 3/2008 | Burchard et al. |
| 2008/0079257 A1 | | 4/2008 | Fessl |
| 2008/0088859 A1 | | 4/2008 | Depta et al. |
| 2008/0106091 A1 | | 5/2008 | Tompkin et al. |
| 2008/0160226 A1 | | 7/2008 | Kaule et al. |
| 2008/0163994 A1 | | 7/2008 | Hoppe et al. |
| 2008/0198468 A1 | | 8/2008 | Kaule et al. |
| 2008/0216976 A1 | | 9/2008 | Ruck et al. |
| 2008/0250954 A1 | | 10/2008 | Depta et al. |
| 2008/0258456 A1 | | 10/2008 | Rahm et al. |

FOREIGN PATENT DOCUMENTS

| | | | |
|---|---|---|---|
| DE | 10308305 | | 9/2004 |
| DE | 102004044459 | | 3/2006 |
| EP | A-0 201 323 | | 11/1986 |
| EP | 0238043 | | 9/1987 |
| EP | 0064067 | | 8/1988 |
| EP | 0 319 157 | | 6/1989 |
| EP | 0330733 | | 9/1989 |
| EP | 0425670 | | 5/1991 |
| EP | 0 754 126 B1 | | 12/1999 |
| EP | A-1 241 022 | | 9/2002 |
| EP | 1 695 121 | | 8/2006 |
| EP | 1 747 099 | | 1/2007 |
| EP | 2631085 | | 8/2013 |
| GB | 2362493 A | | 11/2001 |
| JP | H3 505711 A | | 12/1991 |
| JP | 2000-037995 A | | 2/2000 |
| JP | 2002-046400 A | | 2/2002 |
| JP | 2003-165289 A | | 6/2003 |
| JP | 2005-169879 A | | 6/2005 |
| WO | WO 94/27254 | | 11/1994 |
| WO | WO 97/19820 | | 6/1997 |
| WO | WO 99/13157 | | 3/1999 |
| WO | WO 99/26793 | | 6/1999 |
| WO | WO 01/07268 A1 | | 2/2001 |
| WO | WO 01/63341 A1 | | 8/2001 |
| WO | WO 02/101669 | | 12/2002 |
| WO | WO 03/053713 | * | 7/2003 |
| WO | WO 03/082598 | | 10/2003 |
| WO | WO 2005/052650 | | 6/2005 |
| WO | WO 2005/106601 | | 11/2005 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006/029745 | | 3/2006 |
| WO | WO 2006040069 | | 4/2006 |
| WO | WO 2006056342 | | 6/2006 |
| WO | WO 2006072380 | | 7/2006 |
| WO | WO 2006/087138 | | 8/2006 |
| WO | WO 2006087138 | | 8/2006 |
| WO | WO 2006099971 | | 9/2006 |
| WO | WO 2006/125224 | | 11/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |

OTHER PUBLICATIONS

International Search Report, International Application No. PCT/EP2006/001169, 4 pages, Jun. 30, 2006.
International Preliminary Report on Patentability, International Application No. PCT/EP2006/001169, 5 pages.
International Search Report, International Application No. PCT/EP2006/012374, 4 pages, Sep. 17, 2007.
International Preliminary Report on Patentability, International Application No. PCT/EP2006/012374, 11 pages.
U.S. Appl. No. 11/568,538, filed Sep. 23, 2008, Depta.
U.S. Appl. No. 11/719,843, in pre-exam, Kaule.
U.S. Appl. No. 11/909,115, filed Sep. 19, 2007, Kretschmar.
U.S. Appl. No. 11/995,227, in pre-exam, Gruszczynski.
U.S. Appl. No. 12/097,834, filed Jun. 17, 2008, Kaule.
U.S. Appl. No. 12/294,222, in pre-exam, Hoffmuller.
Wolpert (2000), "Design and Development of an effective optical variable device based security system incorporating additional synergetic security technologies", Proc SPIE, vol. 3973, pp. 55-61.
Philips et al. (2000), "Security enhancement of holograms with interference coatings", Proc SPIE, vol. 3973, pp. 304-316.
Hardwick et al. (2000), "Guardian substrate as ab optical medium for security devices", Proc SPIE, vol. 3973, pp. 176-179.
Steenblik et al. (Jun. 2004), "Unison™ Micro-optic Security Film", Proc SPIE vol. 5310, pp. 321-327.
Van renesse, Ed. (1998), "Optical Document Security", Second Edition, pp. 11, 97, 161-163, 234, 248, 262-264, 297-303, 309-313, 343-344, 376-377, 383-384.
Drinkwater et al. (2000), "Development and applications of diffractive optical security devices for banknotes and high value documents", Proc SPIE 3973, pp. 66-77.

* cited by examiner

SECURITY ELEMENT AND METHOD FOR THE PRODUCTION THEREOF

CROSS-REFERENCE TO RELATED APPLICATIONS

This application is the U.S. National Stage of International Application No. PCT/EP2006/001169, filed Feb. 10, 2006, which claims the benefit of German Patent Applications DE 10 2005 007 749.8, filed Feb. 18, 2005 and DE 10 2005 028 162.1, filed Jun. 17, 2005, all of which are hereby incorporated by reference to the extent not inconsistent with the disclosure herewith.

The present invention relates to a security element for protecting valuable articles. The present invention further relates to a method for manufacturing such a security element, a security paper and a valuable article furnished with such a security element.

For protection, valuable articles, such as branded articles or value documents, are often furnished with security elements that permit the authenticity of the valuable article to be verified, and that simultaneously serve as protection against unauthorized reproduction.

The security elements can be developed, for example, in the form of a security thread embedded in a banknote, a tear strip for product packaging, an applied security strip or a self-supporting transfer element, such as a patch or a label that, after its manufacture, is applied to a value document.

To prevent reproduction of the security elements even with top-quality color copiers, the security elements exhibit multiply optically variable elements that, from different viewing angles, convey to the viewer a different image impression and show, for example, a different color impression or different graphic motifs.

In this regard, it is known to provide security elements with security features in the form of diffraction optical micro- and nanostructures, such as with conventional embossed holograms or gratings, such as Kinegram® and Pixelgram and the like. The counterfeit protection of these elements is based on the viewing-angle-dependent play of colors these elements show. Such security elements are frequently applied in the form of filmstrips or film labels on the surface of value documents.

Publication EP 0 330 733 A1 describes such diffraction optical structures in connection with security threads. Here, the diffraction optical structures are present, for example, directly as embossings in the carrier material of a plastic thread or in an additional layer. The reflecting metal layer present in reflection holograms or grids can be interrupted to produce lettering or a pattern that is visible in transmitted light.

Further, as protection against counterfeits of value documents, security elements are also known in which a three-dimensional hologram and a two-dimensional diffraction pattern are superimposed. A method for manufacturing such "2D/3D holograms" is described, for example, in publication EP 0 064 067 A1.

Since such holograms are now used not only as security elements, but frequently purely decoratively in non-security-critical applications, viewer awareness of holograms employed as security elements is diminishing. The visual effect is no longer perceived by the viewer as a security feature, but rather increasingly as a mere design variant, so that the usefulness of such security features as counterfeit protection is decreasing. Furthermore, the image impressions created in this way can be perceived only from preferred viewing directions and under certain lighting conditions. Particularly with poor lighting conditions, the perceptibility of the holographically produced motif is greatly restricted.

It is further known to employ lens systems as security features. For example, in EP 0 238 043 A2 is described a security thread composed of a transparent material on whose surface a grid comprised of multiple parallel cylinder lenses is embossed. Here, the thickness of the security thread is chosen such that it corresponds approximately to the focal length of the cylinder lenses. On the opposing surface, a printed image is applied in perfect register, the printed image being designed taking into account the optical properties of the cylinder lenses. Due to the focussing effect of the cylinder lenses and the position of the printed image in the focal plane, depending on the viewing angle, different sub-areas of the printed image are visible. In this way, through appropriate design of the printed image, pieces of information can be introduced that are, however, visible only from certain viewing angles. Through the appropriate development of the printed image, also "moving" pictures can be created. However, when the document is turned about an axis that runs parallel to the cylinder lenses, the motif moves only approximately continuously from one location on the security thread to another location.

Based on that, the object of the present invention is to specify a generic security element having high counterfeit security that avoids the disadvantages of the background art.

This object is solved by the security element having the features of the main claim. A manufacturing method for the security element, a security paper and a valuable article having such a security element are specified in the coordinated claims. Developments of the present invention are the subject of the dependent claims.

According to the present invention, the security element exhibits at least one first and one second authenticating feature. Here, the first authenticating feature comprises a first arrangement having a plurality of focusing elements that are present in a first grid, and a second arrangement having a plurality of microscopic structures that are present in a second grid. The first and the second arrangement are disposed to one another in such a way that the microscopic structures of the second arrangement are seen magnified when viewed through the focusing elements of the first arrangement.

Such a magnification effect is also referred to as moiré magnification. The fundamental operating principle of moiré patterns is described in the article "The moiré magnifier," M. C. Hutley, R. Hunt, R. F. Stevens and P. Savander, Pure Appl. Opt. 3 (1994), pp. 133-142. In short, according to this article, moiré magnification refers to a phenomenon that occurs when a grid comprised of identical image objects is viewed through a lens grid having approximately the same grid dimension. As with every pair of similar grids, a moiré pattern results, each of the moiré strips in this case appearing in the shape of a magnified and rotated image of the repeated elements of the image grid.

In addition to the actual magnification effect, the security element according to the present invention can show a characteristic depth or a three-dimensional appearance, as well as motion effects, which are explained in detail below. The second authenticating feature is machine and/or visually verifiable and is not influenced by the first arrangement of the first authenticating feature.

The images produced with the security element according to the present invention can be clearly perceived in a wide range of viewing angles and under substantially all customary lighting conditions and, in addition, provide an optically very attractive security element. Because of the very memorable, novel optical effects, the viewer's attention is drawn even more strongly to the security element.

The focusing elements are preferably present as lens-shaped elements. However, differently formed elements having a focussing effect are also conceivable.

To achieve the magnification effect, the characteristic depth or the three-dimensional appearance and the motion effects of the present invention, the first and second arrangement are advantageously developed such that the spatial frequencies of the first and second grid are slightly different and the two grids are oriented substantially identically to one another. This can be achieved especially in that the first grid and the second grid of the first or second arrangement exhibit a slightly different line screen. Here, the line screen of the two grids expediently lies in the same magnitude. Alternatively, the first and second grid can exhibit a substantially identical line screen, the grids then being disposed slightly rotated against one another.

According to an alternative embodiment, the first and second arrangement can also be developed such that the first grid and the second grid exhibit a substantially identical line screen. In this way, flip image effects can be achieved, which are explained in detail below.

The focusing elements of the first arrangement or the microscopic structures of the second arrangement are preferably disposed to one another in a grid having fixed geometric relationships and spacings. Here, particularly the focusing elements of the first arrangement exhibit as high a surface coverage as possible.

In a preferred embodiment, the line screen of the first and second grid is between approximately 3 µm and approximately 50 µm, preferably between approximately 5 µm and approximately 35 µm, particularly preferably between approximately 10 µm and approximately 20 µm. The preceding dimensions ensure, among other things, that a security element can be manufactured having dimensions with which it is suitable especially for use in a security paper, value document or the like. Such a security element preferably exhibits a total thickness of less than 50 µm.

To achieve additional effects, in a variant of the present invention, the first arrangement can also be developed in such a way that it comprises a combination of focusing elements of different size and line screen.

To facilitate automatic authenticity verification and possibly advanced sensory detection and processing of the valuable articles furnished with the security element, the second authenticating feature preferably comprises a machine-readable layer. Advantageously, the machine-readable layer includes machine-readable feature substances, especially reflecting, magnetic, electrically conductive, polarizing, phase shifting, phosphorescent, fluorescent or other luminescent substances.

According to a preferred variant, the machine-readable layer can be formed by an opaque, screened or very thin, semitransparent metal layer.

In a development of the present invention, the second authenticating feature includes a two-dimensional piece of information. The two-dimensional piece of information can comprise a motif-forming layer that is present in the form of characters, patterns or codes and/or exhibits apertures in the form of characters, patterns or codes. Here, the motif-forming layer is expediently formed as a reflection layer, preferably a metal layer, or a printing layer.

In a preferred variant, apertures can be specifically introduced into the metal layer. They can involve, for example, any pattern, a code or pieces of text information. The apertures are preferably manufactured by means of a washing method described in WO 99/13157 A1, or one of the numerous demetallization methods cited in the same publication. In the washing method, the sub-area to be removed from the metal layer is printed with a porous, soluble printing ink that, in a later method step, is removed again, using a solvent, with the metal layer produced in this sub-area. The washing method offers the advantage that the apertures are producible having particular contour sharpness.

In principle, however, other methods can also be used to remove sub-areas of the metal layer. For example, using an etching ink, it is possible to produce in the metal layer apertures with whose aid an image is imprinted on the metal layer. Alternatively, a protective layer can be imprinted on the metal layer, with the exception of the areas to be removed later, and the metal layer then removed in the unprotected areas, e.g. etched away. In a further preferred method, apertures are produced in that the corresponding areas are printed directly prior to the vacuum deposition of the metal layer with a volatile oil. Then, in the oil-printed sites, no metal separates out in the vacuum deposition method. Laser ablation and the electroerosion method offer further preferred possibilities for producing apertures in the metal layer.

Instead of a metal layer, the reflection layer can also be formed by a reflecting thin-film element. Here, the thin-film element can advantageously comprise a reflection layer, an absorber layer and a dielectric spacing layer disposed between the reflection layer and the absorber layer. In addition, in the reflection layer, apertures can be provided in the form of patterns, characters or codes that form transparent or semitransparent areas in the thin-film element.

In a development of the present invention, the microscopic structures of the second arrangement are present in the form of microcharacters or micropatterns. Here, the microscopic structures can especially be printed. In an alternative embodiment, the microscopic structures can comprise embossed microstructures.

Different methods are used to produce the focussing and especially lens-shaped elements of the first arrangement or the embossed microstructures of the second arrangement. In particular, with the aid of traditional techniques of semiconductor technology (photolithography, electron beam lithography, laser lithography, laser ablation), suitable structures can be imaged in resist materials, possibly refined, electroplated and used to fabricate embossing dies for film embossing. Particularly suited for manufacturing large surfaces are the known methods for embossing in thermoplastic films or in films coated with radiation-curing lacquers. Alternatively, techniques are also known for applying microlens systems to surfaces through ink-jet printing methods or through self-organization processes of microparticles.

The first and the second arrangement are advantageously disposed in such a way that the focusing elements of the first arrangement, developed as elevations, and the embossed microstructures of the second arrangement, point in the same direction. Alternatively, the first and the second arrangement are disposed in such a way that the elevations of the focusing elements of the first arrangement and the embossed microstructures of the second arrangement point in different directions.

Advantageously, the embossed microstructures comprise elements that are present in the form of spherical or aspherical caps, cones, triangular pyramids, trapezoidal pyramids, truncated cones, truncated pyramids or the like, and/or exhibit a base area in the form of characters, patterns or codes. Preferably, the focusing elements of the first arrangement and possibly the embossed microstructures of the second arrangement have circular or elliptical base areas.

In a development of the present invention, the embossed microstructures are embossed in a colored embossing lacquer, preferably a colored opaque or a transparently colored embossing lacquer. Here, the colored embossing lacquer is advantageously a radiation-curing lacquer containing color pigments. The embossed microstructures can also be disposed on a carrier substrate that is colored or provided with an additional ink layer. According to a preferred variant, the embossed microstructures on the structured side of the second arrangement can further be provided with an opaque coating, preferably a metal layer or an opaque ink layer.

In an advantageous development of the present invention, the first and second authenticating feature are disposed to one another in such a way that a visually perceptible 2D/3D effect is created. Here, the microscopic structures expediently comprise embossed microstructures that are coated with a reflection layer, preferably a metal layer, providing the second authenticating feature. To increase the counterfeit protection, it is advisable to provide, in the reflection layer, apertures in the form of characters, patterns or codes, or to develop the reflection layer in the form of characters, patterns or codes.

Advantageously, in the security element according to the present invention, the focusing elements of the first arrangement and/or microscopic structures of the second arrangement are disposed on a carrier substrate. To orient the first and second arrangement toward one another with regard to a suitable spacing coordinated with the focal distance of the first arrangement, a spacing layer and/or adhesive layer can be provided. In the case of embossed focusing elements, such a spacing layer can be formed by the carrier substrate.

The lens-shaped elements according to the present invention can be present as transmissive, refractive or diffractive lenses or as a hybrid thereof. Alternatively, the lens-shaped elements can be formed by polymer or glass beads that are embedded to a certain level in lacquer.

If refractive lenses are used, a sufficiently large difference should exist between the refractive index of the lenses and that of the adjacent environment to achieve a lens effect. As lenses are typically manufactured from lacquers having a refractive index of 1.2 to 1.5, the effect of the lenses is strong when the layer adjacent to the lenses is provided, through air, with a refractive index of 1. However, exposed lenses exhibit the disadvantage that, on the one hand, it is possible to mold them easily, and on the other hand, in circulation, the valuable articles provided with the security element can suffer from the influence of dirt, chemicals or mechanical effects.

It is thus often desirable to embed the lenses. To this end, especially high-index protective layers can be used that exhibit refractive indices that differ from the refractive index of the lenses by at least 0.3. For example, lacquers pigmented with nanoparticles made of titanium oxide lend themselves to this. Such and similar systems having a refractive index between 1.7 and 2 are commercially available.

In a preferred embodiment, the lens-shaped elements are provided with a reflection layer and thus act as a kind of concave reflector.

Preferably, the security element is a security thread, a tear strip, a security band, a security strip, a patch or a label for application to a security paper, value document or the like. For example, in a preferred embodiment, the security element can span transparent or freestanding areas (holes), its different optical appearances on the two sides becoming visible from both sides.

The present invention also includes a method for manufacturing a security element of the kind described above, in which a first authenticating feature is formed by combining a first and a second arrangement. The first arrangement, having a plurality of focusing elements that are present in a first grid, is disposed over a second arrangement, having a plurality of microscopic structures that are present in a second grid, in such a way that the microscopic structures of the second arrangement are seen in magnification when viewed through the focusing elements of the first arrangement. The first authenticating feature is further combined with at least a second authenticating feature that is machine and/or visually verifiable and not influenced by the first arrangement of the first authenticating feature.

In the second arrangement, the microscopic structures according to the present invention are advantageously developed as embossed microstructures. The embossing of the microstructures preferably occurs in a colored embossing lacquer, preferably a colored opaque or a transparently colored embossing lacquer. Here, in a first step, the colored lacquer can be applied to a carrier substrate and, in a second step, embossed with an embossing die in such a way that areas of different profile height or profile depth are created, which then form the microstructures.

A security paper for manufacturing security documents, such as banknotes, identity cards and the like, is preferably furnished with a security element of the kind described above. In particular, the security paper can comprise a carrier material made of paper and/or plastic.

The present invention also includes a valuable article, such as a branded article, a value document or the like, that is provided with a security element described above. The valuable article can especially be a security paper, a value document or a product packaging.

Valuable articles within the meaning of the present invention are especially banknotes, stocks, bonds, certificates, vouchers, checks, valuable admission tickets and other papers that are at risk of counterfeiting, such as passports and other identity documents, as well as product protection elements such as labels, seals, packaging and the like. In the following, the term "valuable article" encompasses all such articles, documents and product protection means. The term "security paper" is understood to be the not-yet-circulatable precursor to a value document, which precursor can exhibit, in addition to the security element, further authenticating features, such as luminescent substances provided in the volume. Security paper is customarily present in quasi-endless form and is further processed at a later time.

Further exemplary embodiments and advantages of the present invention are explained below by reference to the drawings, in which a depiction to scale and proportion was omitted in order to improve their clarity.

Figure 2A:
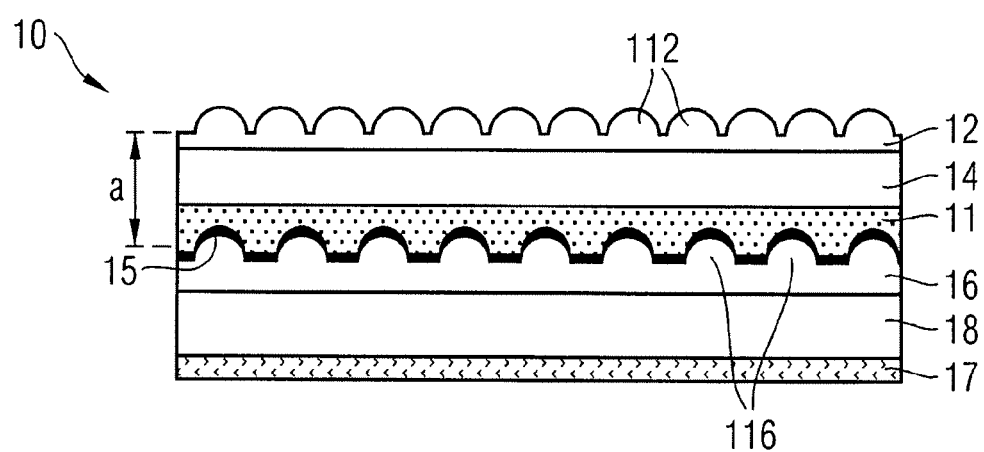
Figure 2B:
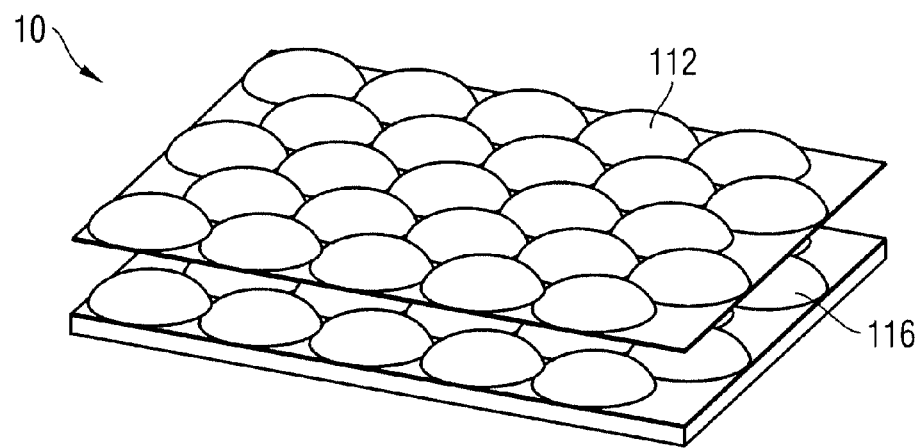
Figure 3:
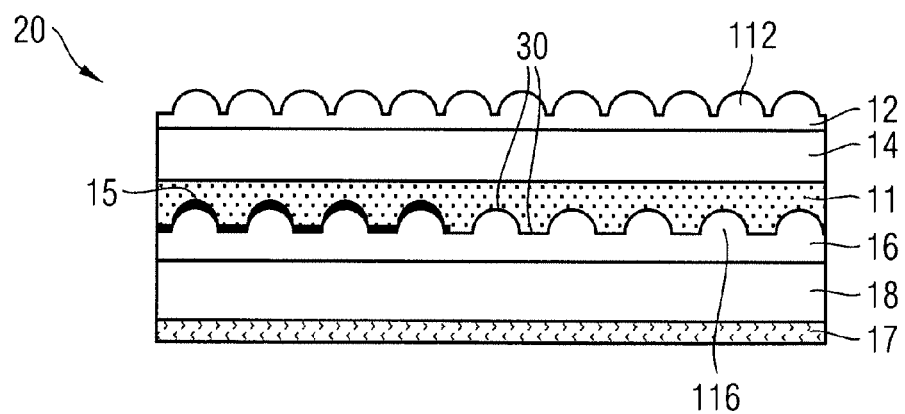
Figure 4:
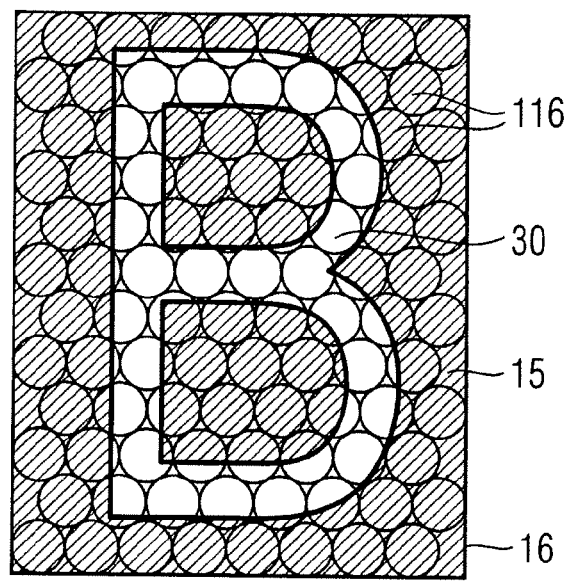
Figure 8:
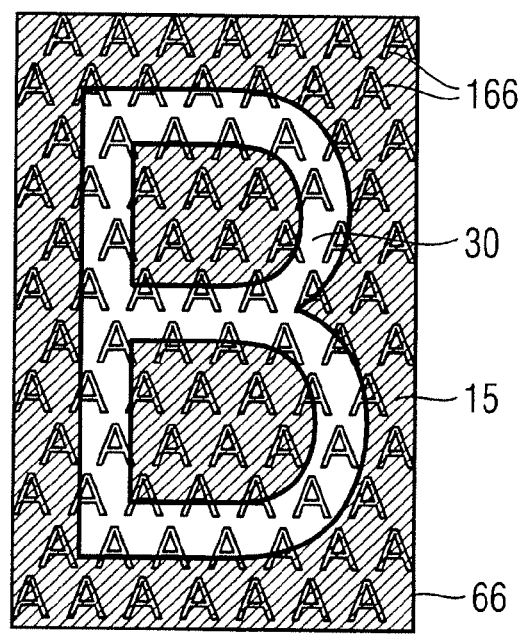
Figure 5:
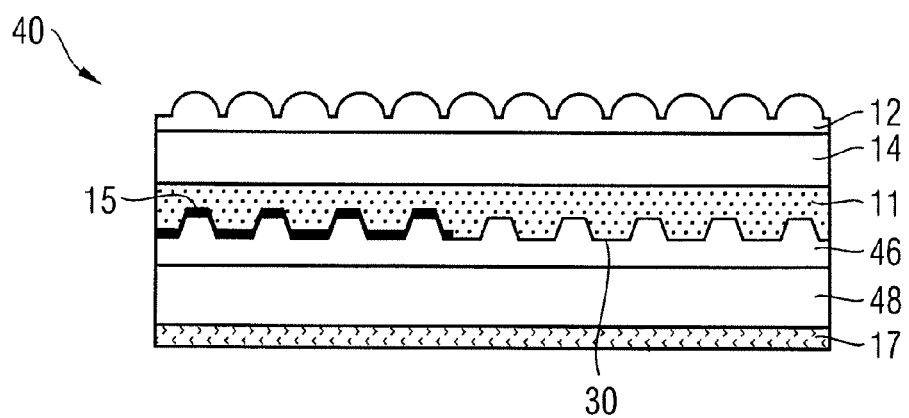
Figure 6:
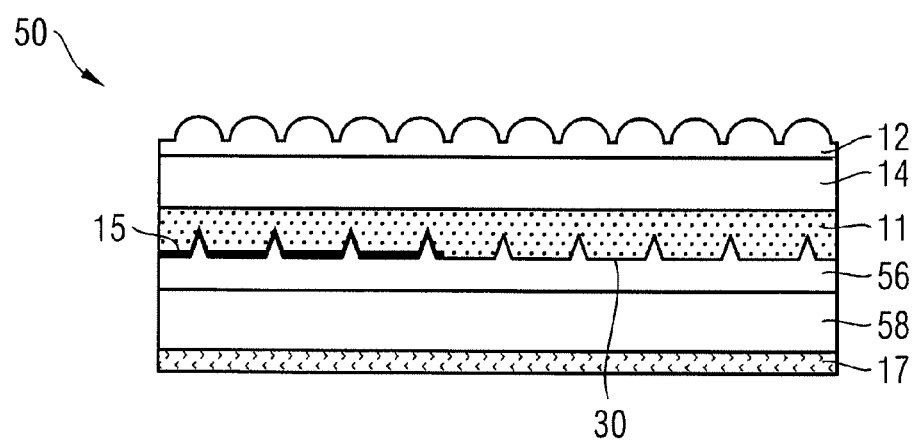
Figure 7:
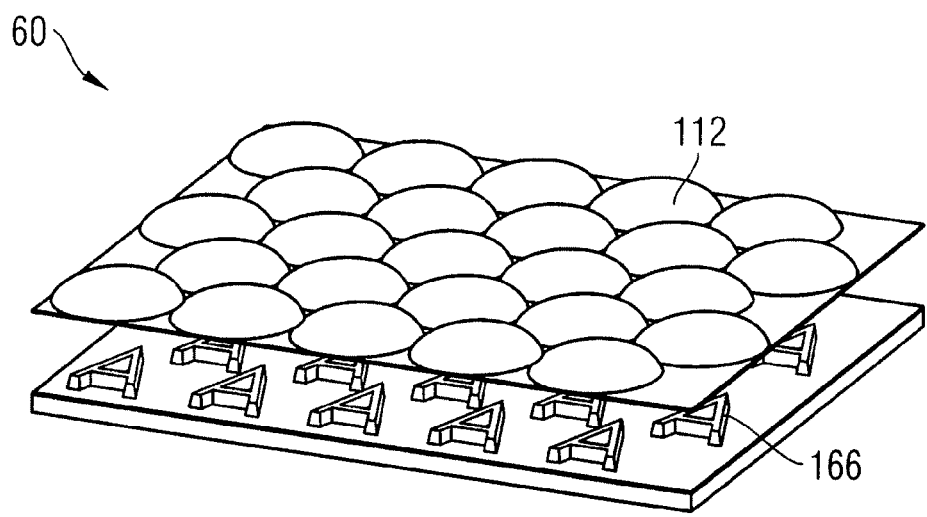
Figure 9A:
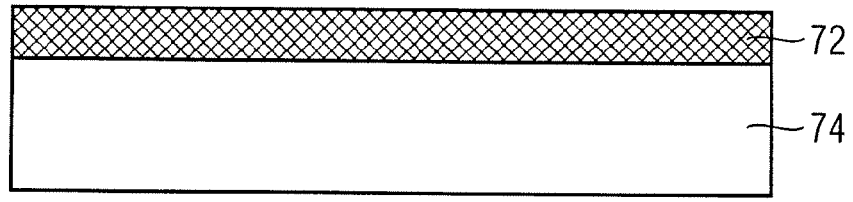
Figure 9B:
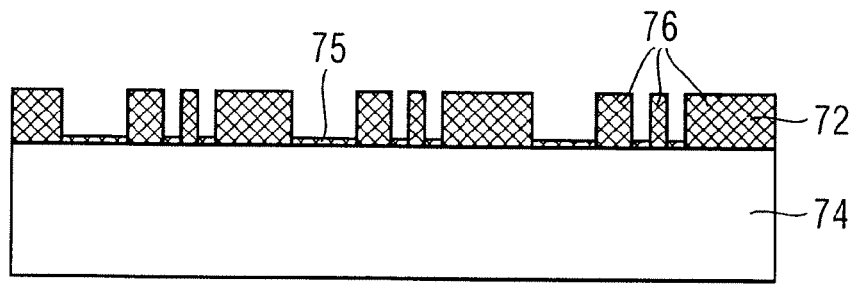
Figure 10:
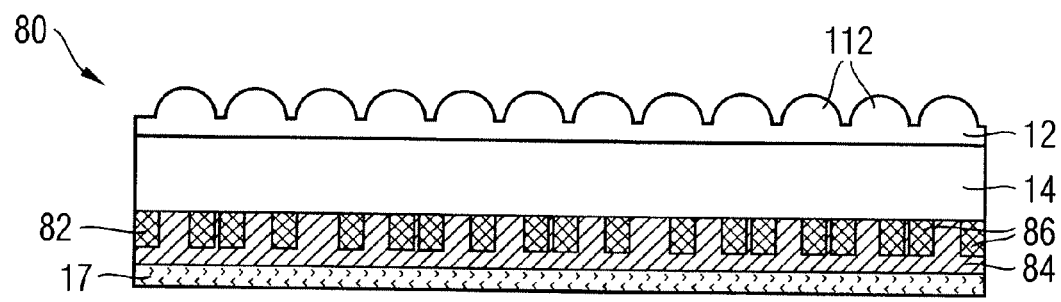
Figure 11:
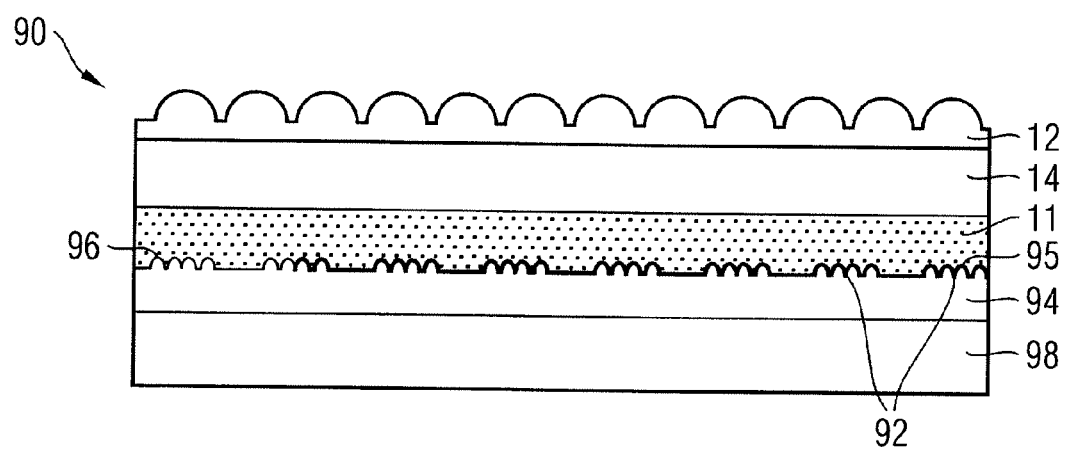
Figure 12:
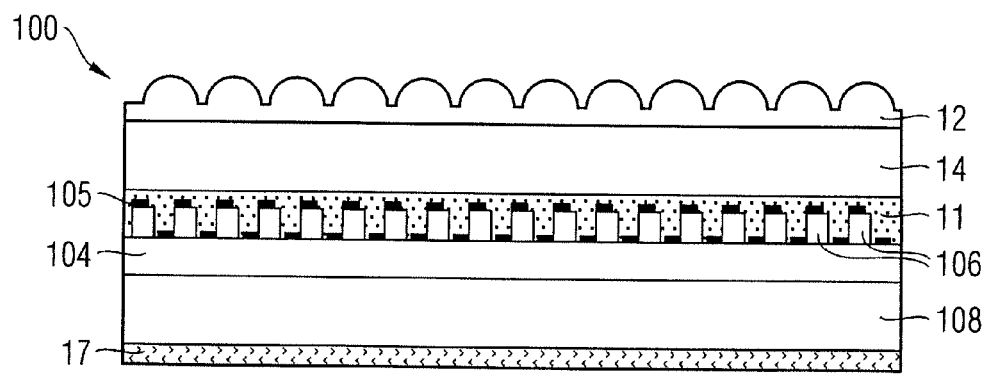
Figure 13:
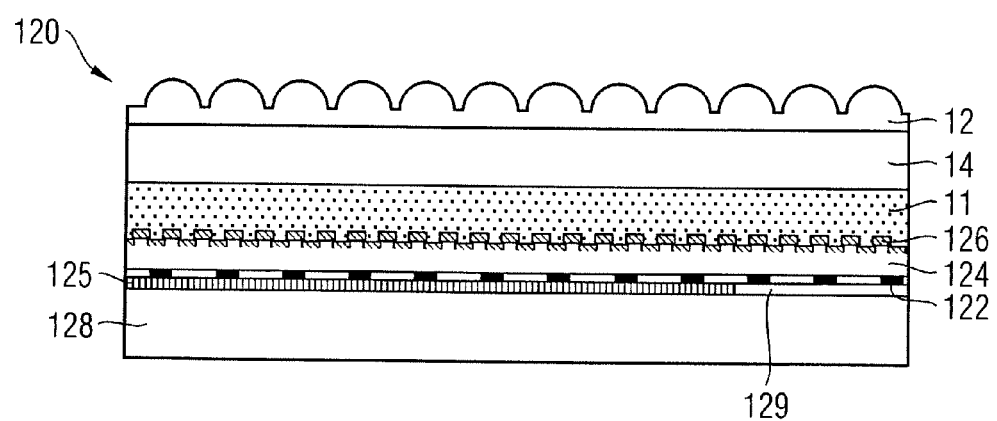
Figure 14:
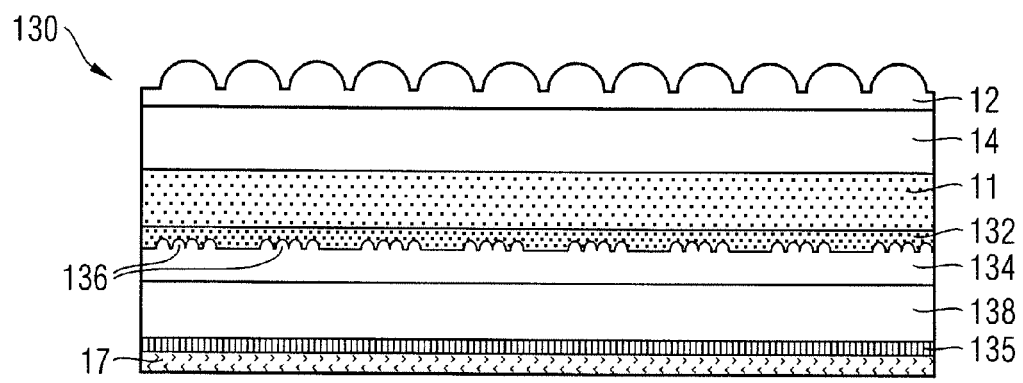
Figure 15:
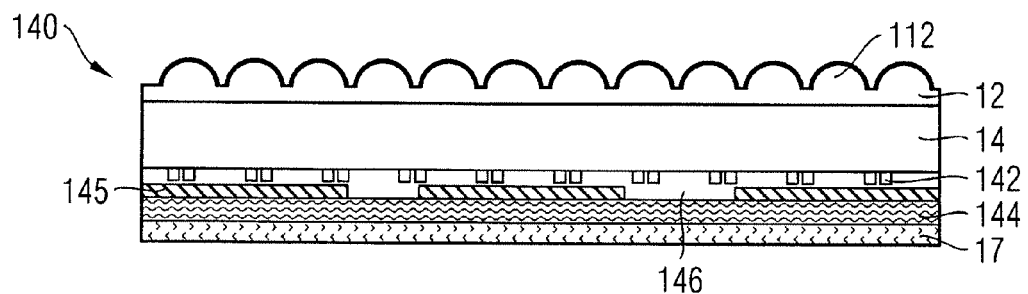
Figure 16:
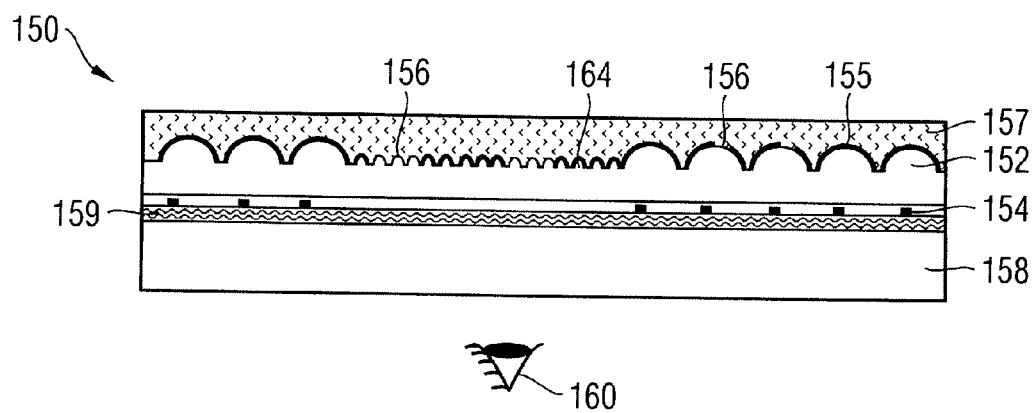
Figure 17:
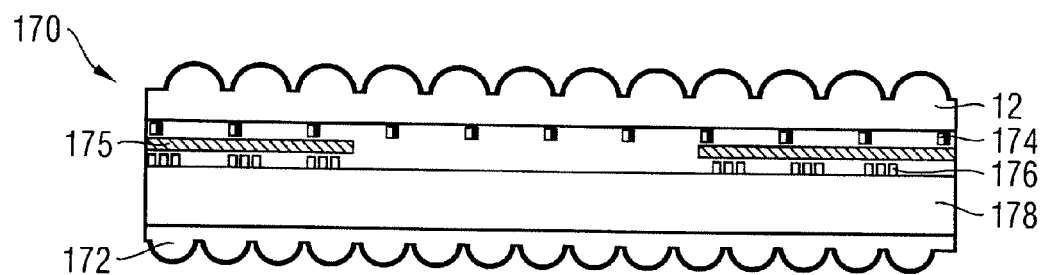
Figure 18A:
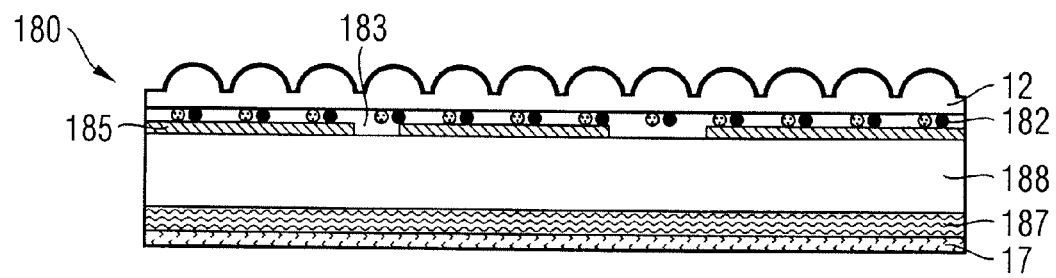
Figures 18B, 18C:
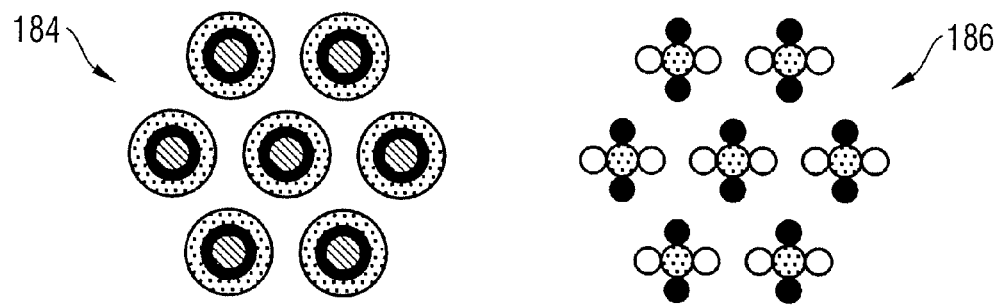
Figure 19:
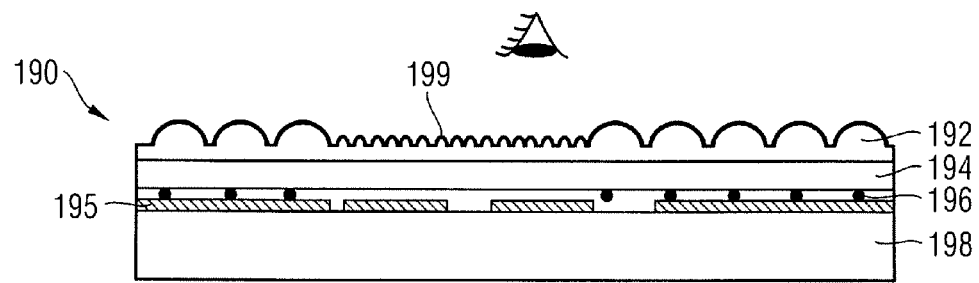
Figure 20:
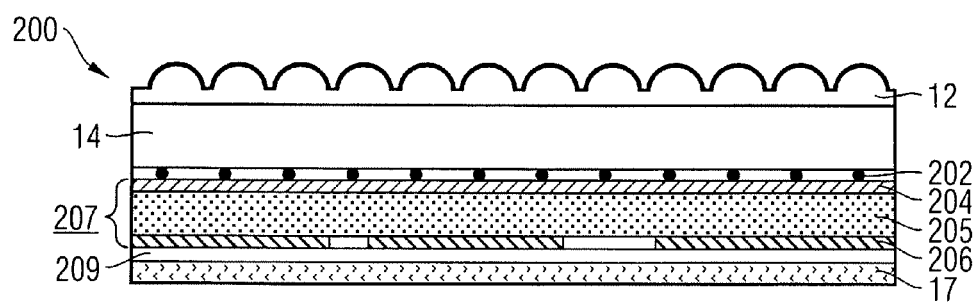
Figure 21:
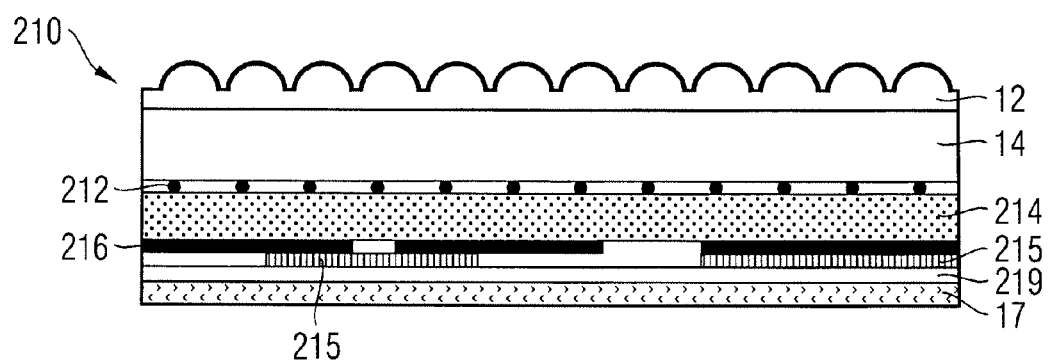
Figure 22:
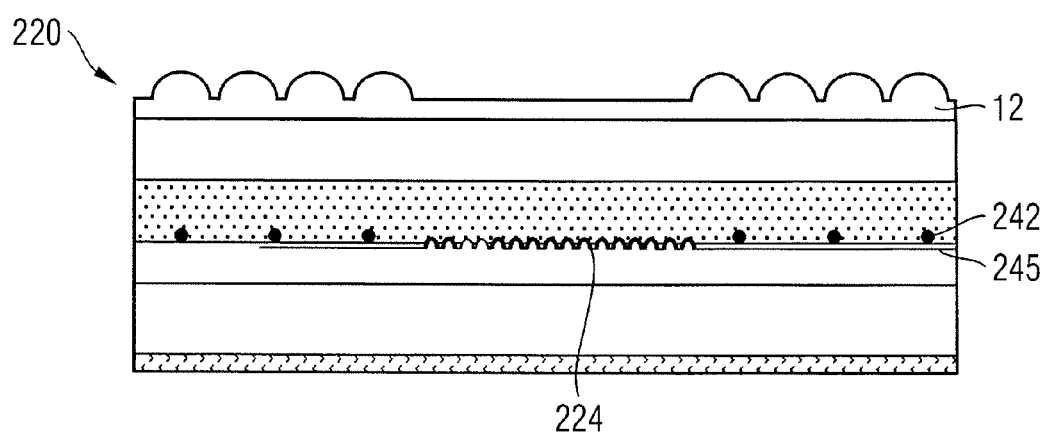
Figure 23:
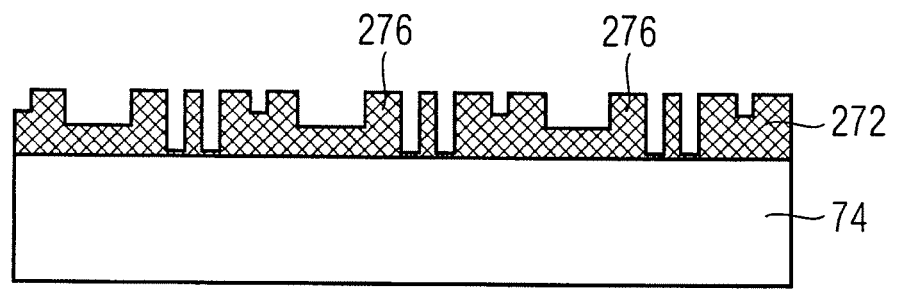
Figure 24:
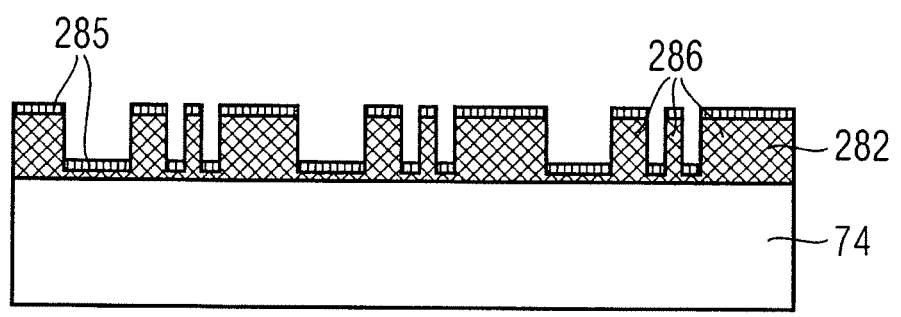

Shown are:

FIG. 1 a schematic diagram of a banknote having an embedded security thread and an affixed security element, FIG. 2 in (a), a cross-section through a security element according to the present invention, and in (b), an exploded view of a first and second arrangement of this security element, FIG. 3 a security element according to a further exemplary embodiment of the present invention, in cross-section, FIG. 4 a top view of a second arrangement of the security element in FIG. 3, FIG. 5 a security element according to a further exemplary embodiment of the present invention, in cross-section, FIG. 6 a security element according to yet a further exemplary embodiment of the present invention, in cross-section, FIG. 7 an exploded view of a first arrangement and a second arrangement, developed as a microtext grid, of a security element according to the present invention, FIG. 8 a top view of the second arrangement of the security element in FIG. 7, FIG. 9 in (a) and (b), steps for manufacturing microscopic structures for the second arrangement of a security element according to a further exemplary embodiment of the present invention, FIG. 10 a security element having microscopic structures manufacturable according to the exemplary embodiment in FIG. 9, in cross-section, FIG. 11 a security element according to a further exemplary embodiment of the present invention, in cross-section, FIG. 12 a security element according to yet a further exemplary embodiment of the present invention, in cross-section, FIG. 13 a security element according to yet a further exemplary embodiment of the present invention, in cross-section, FIG. 14 a security element according to yet a further exemplary embodiment of the present invention, in cross-section, FIG. 15 a security element according to yet a further exemplary embodiment of the present invention, in cross-section, FIG. 16 a security element, developed as a transfer element, according to an exemplary embodiment of the present invention, in cross-section, FIG. 17 a dual-sided security element according to a further exemplary embodiment of the present invention, FIG. 18 in (a), a cross-section through a security element according to the present invention, and in (b) and (c), top views of special developments of the microscopic structures of the second arrangement of this security element, FIG. 19 a security element according to a further exemplary embodiment of the present invention, in cross-section, FIG. 20 a security element according to yet a further exemplary embodiment of the present invention, in cross-section, FIG. 21 a security element according to yet a further exemplary embodiment of the present invention, in cross-section, FIG. 22 a security element according to yet a further exemplary embodiment of the present invention, in cross-section, FIG. 23 a cross-section through a second arrangement of a security element according to an exemplary embodiment of the present invention, and FIG. 24 a cross-section through a second arrangement of a security element according to a further exemplary embodiment of the present invention.

The invention will now be explained in detail using a banknote as an example. FIG. 1 shows a schematic diagram of a banknote 1 having two security elements 2 and 6, each of which is formed according to an exemplary embodiment of the present invention. The first security element constitutes a security thread 2 that stands out in certain window areas 4 on the surface of the banknote 1, while in the areas lying therebetween it is embedded in the interior of the banknote 1. The second security element is formed by an affixed security element 6 of any shape.

To explain the principle according to the present invention, FIG. 2 schematically shows the layer structure of a security element 10 according to the present invention, in cross-section (FIG. 2 (a)), and for a better overview, in exploded view (FIG. 2 (b)). For example, the security element 10 can be present in the form of a security thread. However, within the scope of the present invention, it is likewise possible to give the security element any other contour shape.

On a carrier substrate 14, for example a PET film, an arrangement of focussing elements, in the exemplary embodiment a lens arrangement 12, is embossed in a radiation-curing lacquer, e.g. a UV lacquer. The lens arrangement 12 exhibits a plurality of spherical lens-shaped elements or microlenses 112 that are disposed in a grid having a fixed geometry, e.g. a hexagonal grid. The microlenses are present in the form of a convex elevation and act as convex lenses when the security element is viewed from the direction of the lens arrangement 12. In the example, the microlenses of the lens arrangement 12 exhibit a lens aperture of 10 μm, a lens radius of approximately 12 μm and a lens spacing of 11 μm.

The lens arrangement 12, together with the carrier substrate 14, is joined via an adhesive layer 11 with an arrangement of microscopic structures or a microstructure arrangement 16 that is present on a carrier substrate 18 and, together with the lens arrangement 12, forms a first authenticating feature. Also the microstructure arrangement 16 exhibits, in the example, spherical lens-shaped elements or microlenses 116 that are disposed in the same geometric arrangement as the lens arrangement 12, i.e. in a hexagonal grid. In the example, the microlenses 116 also exhibit the same geometric dimensions as the microlenses 112. The spacing a of the first lens arrangement 12 from the microstructure arrangement or second lens arrangement 16 preferably lies in the magnitude of the focal distance of the microlenses 112 of the first lens arrangement. Instead of a hexagonal grid, the microlenses 112 and 116 can, of course, also be disposed, alternatively, in polygonal grids, such as rectangular grids.

As indicated in FIG. 2 (a), the spacing existing between the individual microlenses 112 in the section plane differs from the distance existing between the microlenses 116. Such a slight difference in the spatial frequencies of the microlenses 112, 116 of the first and second lens arrangement 12 or 16 serves, as described in detail below, to produce the desired moiré magnification effect. Here, it is pointed out again that, for reasons of improved clarity, the depiction in the drawings does not show the security element according to the present invention true to scale and proportion.

The difference in the spatial frequencies can be produced, for example, in that the grids of the first and second lens arrangement 12, 16 exhibit a substantially identical line screen, but are disposed slightly turned or rotated against one another. In this case, the actual lens spacing of the microlenses 116 of the second lens arrangement 16 coincides with that of the microlenses 112 of the first lens arrangement 12. Alternatively, this effect can also be produced in that the first and the second lens arrangement 12, 16 exhibit a slightly different lens spacing. Decisive is merely that the spatial frequencies of the two grids differ slightly. Furthermore, it must be taken into account that the magnification effect increases the smaller the difference in the spatial frequencies is. The microlenses 116 of the second lens arrangement 16 are thus magnified more or less by the microlenses 112 as a function of their spatial frequency. In this way, depending on the desired magnification effect, a suitable difference in the spatial frequencies of the microlenses 112, 116 can be provided.

The microlenses 116 of the lens arrangement 16 are provided with a continuous metal layer 15 that is, for example, vapor deposited. If the security element 10 is viewed from the direction of the side of the first lens arrangement 12, then the microlenses 116 do not act as lenses in the proper sense, but rather as reflecting elements or microstructures that reflect with different intensity depending on the location and angle of the impinging light. By applying the metal layer 15, in addition, a second authenticating feature is obtained in the form of a conductive layer, the authenticating feature being able to be machine-verified.

The metal layer 15 can also be formed as a semitransparent metal layer. Such a semitransparent metal layer can be produced, for example, by a very thin metal layer or a screened metal layer.

Further, to transfer the security element 10 to a security paper or to improve the adhesion of a security element developed as a security thread, an activatable adhesive 17 can be applied to the carrier substrate 18 of the second lens arrangement.

The structure of a security element according to the present invention in a further embodiment will now be explained in greater detail with reference to FIGS. 3 and 4. Here, FIG. 3 depicts a cross-section through the security element 20 and FIG. 4 shows a top view of a second lens arrangement 16 of the security element 20.

The security element 20 according to the present invention and shown in FIGS. 3 and 4 corresponds in structure substantially to the security element 10 in FIG. 2. Here, however, to increase the counterfeit protection, in the metal layer 15 is additionally provided, as a second authenticating feature, an aperture 30 that, in the exemplary embodiment depicted, shows a concrete piece of information in plain text, namely the letter "B". Diverse methods are known for producing such apertures. Preferred, however, is the production of the aperture in the washing method, as described in publication WO 99/13157 A1. The apertures 30 are visually perceptible particularly well in transmitted light, and in incident light, substantially the motion image produced by the lens arrangement 12 is perceptible with a moiré magnification effect.

When viewed, the security element 20 according to the present invention shows an extremely magnified three-dimensional-appearing image of the microlenses 116 of the second lens arrangement 16, which image exhibits a characteristic depth, as well as motion effects. Here, the microlenses 116 appear as magnified "mounds". Through the magnification effect, the reflecting microlenses 116 of the second lens arrangement 16, which are actually present in dimensions that lie below the resolution limit of the human eye, can now be visually perceived by the viewer. The three-dimensionality of the image is further amplified by the embossed, and thus as such already three-dimensional microlenses 116. The motion effects are distinguished in that the magnified image appears to float over, under or in the surface of the security element and to move in a parallactic or also ortho-parallactic manner. The three-dimensional images produced in this way exhibit the advantage that they can be perceived under substantially all common lighting conditions. Furthermore, they provide very memorable optical effects.

The described magnification effect of the microlenses 112 of the first lens arrangement 12 relates only to the microlenses 116 disposed in a grid in the second lens arrangement 16, and not to the piece of information produced by the apertures 30 in the metal layer 15. As can be seen in FIG. 4, such a piece of information can be extended across a plurality of microlenses. A repetition of the piece of information in a regular grid is not given in the present example, but is common in practice. When viewed in reflection, particularly when the security element 20 is disposed on a dark substrate, the letter created by the apertures 30 thus appears to the viewer as a two-dimensional image in original size, the image appearing to float on the three-dimensional-appearing magnified image of the lens arrangement 16.

FIGS. 5 and 6 show further exemplary embodiments of the present invention in which the development of the microstructure arrangement was varied. Moreover, variations in the microlenses 112 or the lens arrangement 12 in terms of lens shape, grid, lens aperture, lens radius and lens spacing are conceivable within the scope of the present invention. In particular, the lens arrangement 12 can be present as a combination of microlenses that differ in at least one of these parameters.

The exemplary embodiment of FIG. 5 shows a security element 40 having, disposed on a carrier substrate 14, a lens arrangement 12 that exhibits a plurality of microlenses 112. In the example, the microlenses 112 exhibit a lens aperture of 20 μm, a lens radius of approximately 12 μm and a lens spacing of 21 μm.

A microstructure arrangement 46 that is likewise present on a carrier substrate 48, for example a PET film, is embossed in a radiation-curing lacquer. The microstructure arrangement 46 exhibits a plurality of embossed elements that exhibit a circular base area and a trapezoidal cross-section. The elements of the microstructure arrangement 46 are disposed in the same geometric arrangement as the microlenses 112 of the lens arrangement 12, in the example in a hexagonal grid. The difference in the spatial frequency of the respective grid of the first lens arrangement 12 and microstructure arrangement 46 can be suitably selected depending on the desired magnification effect. This can occur, for example, in that the elements of the microstructure arrangement 46 exhibit a slightly larger spacing between themselves compared with the spacing of the microlenses 112 or, if the spacing is substantially identical, are disposed slightly rotated against one another. When viewed from the direction of the lens arrangement 12, a three-dimensional, magnified image of the elements of the microstructure arrangement 46 is seen. It exhibits a characteristic depth, as well as motion effects, and also shows the elements of the microstructure arrangement 46 as magnified "mounds" or truncated cones.

To the microstructure arrangement 46 is further applied, e.g. vapor deposited, as a second authenticating feature, a metal layer 15 in which, to increase the counterfeit protection, apertures 30 can be provided that show a concrete piece of information that appears two dimensional to the viewer.

The security element 50 according to the present invention and depicted in FIG. 6 corresponds in structure substantially to the security element 40 in FIG. 5. Here, however, the microstructure arrangement 56 disposed on a carrier substrate 58 comprises, disposed in a grid, a plurality of embossed elements having a circular base area and exhibiting a triangular cross-section. A three-dimensional magnified image of the elements of the microstructure arrangement 56 that are perceptible as "cones" thus appears to the viewer. The three-dimensionality of the image is further amplified by the as such already three-dimensional elements.

Using traditional semiconductor technology methods, it is also possible to manufacture microstructures having any shapes and contours. Thus, for example, embossed microstructures can be present in the form of letters or numerals. If such a system is illuminated with light, a brightness pattern of the lettering is created. Microstructures designed in this way are thus likewise suitable for the security element according to the present invention.

The structure of such a security element according to the present invention, in which a microstructure arrangement is formed as an embossed microtext grid, will now be explained in greater detail with reference to FIGS. 7 and 8. Here, for a better overview, FIG. 7 shows an exploded view of the security element 60, and FIG. 8 shows a top view of a sub-area of the microstructure arrangement 66 of the security element 60.

The security element 60 differs from the above-described security element according to the present invention in that, here, instead of an arrangement of elements having a circular base area, an arrangement 66 of embossed microtext structures 166 present in a grid is used. In the exemplary embodiment depicted, the microtext structures 166 show a concrete piece of information, namely the letter string "A", which is present in dimensions that correspond approximately to those of the microlenses 112 and thus lie below the resolution limit of the human eye. Further, the microtext structures 166 of the arrangement 66 are disposed in the same geometric arrangement as the lens arrangement 12, in the example, in a hexagonal grid. Moreover, in the metal layer 15 that is applied to the arrangement 66 and that provides the second authenticating feature, an aperture 30 is provided that shows, in the exemplary embodiment depicted, a concrete piece of information in the form of the letter "B".

Also in this example, a slight difference in the spatial frequencies of the microlenses 112 and the microstructures 166, which can be achieved through the above-described measures, serves to produce the desired moiré magnification effect of the first authenticating feature. Accordingly, when viewed, the security element 60 according to the present invention shows an extremely magnified three-dimensional image of the microtext structures 166 that exhibits a characteristic depth, as well as motion effects, and shows the microtext structures 166 as a magnified letter string "A". Superimposed on this image as a two-dimensional image, the viewer can perceive the concrete piece of information that is present as the aperture 30, namely the letter "B", in original size.

The three-dimensional effect of the embossed microscopic structures described is created by the arrangement of the microscopic structures in a grid, regardless of whether the microscopic structures as such are already three-dimensional. In contrast, the piece of information produced by the aperture 30 in the metal layer 15 and extending across a plurality of microlenses 112 is not present in a regular grid. Thus, it appears to the viewer merely as a two-dimensional image in original size that appears to be disposed on the three-dimensional, magnified image of the embossed microscopic structures.

Ideally, security elements exhibit a total thickness of less than 50 μm. As a result, microlenses and thus microscopic structures having very high resolution are necessary. However, the manufacture of microscopic structures in a magnitude that is suitable for security applications and especially for the use of security elements furnished therewith in a security paper, value document or the like, is prone to certain difficulties.

If e.g. microlenses having a lens diameter of about 30 μm are used for a lens arrangement, the microscopic structures of the microstructure arrangement must likewise lie in the magnitude of about 30 μm. Here, if not merely punctiform microstructures are to be used, but rather more complex microstructures, such as letters, numerals, characters such as "€" or "$" signs, logos or even images, the resolution of the microscopic structures must be just a few micrometers or even considerably less. Often, it is not possible to easily manufacture microscopic structures of this magnitude with traditional printing techniques.

Thus, in the following, some exemplary embodiments are presented in which the microscopic structures are manufactured in another manner.

First, with reference to FIG. 9, a method for manufacturing a microstructure arrangement having embossed, colored microstructures is described in greater detail. In the method represented in FIG. 9, among other things, the fact that it is possible to produce very small structures with the aid of embossing techniques is used to advantage. Here, in the exemplary embodiment, these structures are not, as is usual, produced with a colorless embossing lacquer and vapor deposited with e.g. a reflecting metal layer to achieve an optical effect, but rather, a noticeably colored, especially opaque embossing lacquer 72 is used. Suitable embossing lacquers include e.g. UV lacquers containing color pigments.

As shown in FIG. 9 (a), the colored embossing lacquer 72 is applied in a first step, through conventional printing techniques, to the entire surface of a transparent carrier substrate 74, for example a PET film, in a suitable layer thickness of about 1 to 30 μm, preferably about 1 to 15 μm. The microstructuring of the embossing lacquer 72 then occurs by means of known embossing techniques. For example, it is easily possible, with the aid of traditional lithographic techniques or other techniques from semiconductor technology (photolithography, electron beam lithography, laser ablation) to manufacture suitable embossing dies that can exhibit microstructures in the range of a few nanometers to several hundred micrometers. The resolution that can be achieved therewith is thus superior to that of traditional printing techniques. When embossing, the embossing lacquer layer 72 is structured into thin, i.e. nearly colorless, areas 75 and thicker, microstructure-forming areas 76 having high color saturation, creating a colored microimage or a microstructure arrangement having high resolution (FIG. 9 (b)). Here, the profile heights or depths lie between about 2 μm and 30 μm.

Alternatively, it is also conceivable to coat a colored carrier substrate or a carrier substrate provided with an additional ink layer with a white or other colored, opaque embossing lacquer. In this way, it is possible to create (negative) microstructures through areal "masking" of the underlying (colored) carrier substrate.

The embossed microstructures 76 produced with the above method are disposed in a grid that corresponds in magnitude and geometric relationship to the grid of an arrangement of focussing elements that is not shown, with which the microstructure arrangement can be combined to form a first authenticating feature.

The security element can exhibit further authenticating features in the form of a machine-readable layer that includes machine-readable feature substances, for example magnetic, electrically conductive, phosphorescent or fluorescent substances. Also the embossing lacquer layer 72 as such can include machine-readable feature substances. For example, magnetic pigments can be added to the embossing lacquer.

In a further step not shown here, the embossed microstructures 76 obtained with the above method can, where appropriate, be cured by means of electromagnetic radiation, e.g. ultraviolet radiation.

A further option for manufacturing embossed microstructures will now be described in greater detail by reference to a security element 80 shown in FIG. 10. In this exemplary embodiment, the embossing is done in a transparently colored embossing lacquer 82, e.g. a transparently colored UV lacquer that is applied to a transparent carrier substrate 14, e.g. a PET film. Thereafter, the embossed microstructures 86 can be present e.g. in the form of characters or patterns. On the other side of the carrier substrate 14 is embossed in a radiation-curing lacquer, e.g. a UV lacquer, a lens arrangement 12 that exhibits a plurality of spherical lens-shaped elements or microlenses 112 disposed in a grid.

Under the embossing lacquer layer 82 is applied a reflecting metal layer or an opaque, e.g. white, ink layer 84. In this way, when different colored embossing lacquers and masking inks are used, it is possible to produce especially subtractive and additive color effects.

The desired magnification effect can be produced by a slight difference in the spatial frequencies of the microlenses 112 and the embossed microstructures 86, which can be achieved through the above-described measures. Accordingly, when viewed, the security element 80 according to the present invention shows an extremely magnified three-dimensional image of the microstructures 86 that exhibits a characteristic depth, as well as motion effects, and shows the microstructures 86 as a magnified character or pattern string.

Further, to transfer the security element 80 to a security paper or to improve the adhesion of a security element developed as a security thread, an activatable adhesive 17 can be applied to the metal or ink layer 84.

In an alternative variant of this exemplary embodiment, not shown here, the transparently colored embossing lacquer is disposed on one side of a carrier substrate, while the metal or ink layer is applied to the opposing side of the carrier substrate. The microstructure arrangement created in this way is then joined via an adhesive layer with a lens arrangement to form a security element according to the present invention.

With reference to FIG. 23, a further exemplary embodiment for manufacturing embossed microstructures with the aid of embossing techniques will now be described in greater detail. In this exemplary embodiment, the embossing is likewise done in a colored embossing lacquer 272, e.g. a UV curing lacquer, that is applied across the entire surface of a transparent carrier substrate 74, e.g. a PET film. Here, the microstructures 276 of the microstructure arrangement are formed having different profile heights or depths that achieve a different color saturation and thus a different contrast in accordance with the respective thickness of the lacquer. In this way, it is possible to realize the microstructures also, for example, as halftone images.

A further option for manufacturing embossed microstructures, with which it is also possible to create structures such as the microtext structures 166 shown in FIG. 7, will now be explained by reference to a microstructure arrangement shown in FIG. 24. Here, the microstructure arrangement shown in FIG. 24 corresponds substantially to the microstructure arrangement in FIG. 9. Here, however, the microstructures 286 embossed in a colored embossing lacquer 282 exhibit a reflecting coating, in the example a metal layer 285, that can be provided, for example, by vapor deposition.

Depending on the choice of color and choice of alloy used for the metal layer 285, it is possible to match e.g. bimetallizations (aluminum/copper, aluminum/aluminum, etc.). Furthermore, it is conceivable to use, instead of a transparent carrier substrate 74, a colored carrier substrate, or to apply to the transparent carrier substrate 74 an additional ink layer, not shown here, allowing additional color effects to be achieved. In addition to the shown full-surface application of the colored embossing lacquer, it is also possible to apply it only in sub-areas, patterned, where appropriate.

Also the microstructure arrangements shown in FIGS. 23 and 24 are disposed in a grid that corresponds in magnitude and geometric relationship to the grid of an arrangement of focussing elements not shown here, with which the microstructure arrangement can be combined to form a security element according to the present invention.

In a further variant for manufacturing embossed microstructures, an embossing die can be used that also includes, in addition to the microstructures, diffraction optical structures. In this way, it is possible to produce novel combinations of e.g. diffractive or hologram-like gratings and microtext.

With an appropriate lateral size, it is also possible to perceive the microstructures (e.g. letters or numbers) with the human eye. The above-shown options for manufacturing embossed microstructures are thus also suitable for creating (macroscopic) positive or negative text, for example for the use of such in security threads. Here, the embossing is done in a colored lacquer that is applied across the entire surface of a transparent or colored carrier substrate, e.g. a PET film. Here, the embossed microstructures are present in a magnitude that can still be detected with the human eye.

Such a layer structure can additionally be furnished with a masking film or a transfer film. To transfer the security element created in this way to a security paper, or to improve the adhesion of this security element when used as a security thread, an activatable adhesive can further be applied to the carrier substrate. Further, it is conceivable to apply the colored lacquer only in sub-areas and to combine the advantages of conventional printing technology and embossing technology.

In particular, with traditional, print-based methods, such as the method described in WO 99/13157 A1, in the variant shown in FIG. 24, areas can additionally be demetallized with the aid of customary methods. This combination of the various methods for manufacturing microtext permits novel embodiments. If, for example, the metal layer over an embossed thinning site is removed within the tolerances, an approximately transparent aperture is created. Partial-surface overlays of the thinning sites or apertures manufactured with the different methods are also conceivable.

In the following, further manufacturing variants for microscopic structures for use in a security element according to the present invention will be illustrated.

Microscopic structures in a magnitude suitable for security applications can be achieved in original manufacture for example by using electron beam lithography with lateral resolutions of less than 100 nm. In this way, it is thus possible, for example, to produce microscopic structures having microimages in which an individual microstructure is composed of different diffractive and/or hologram-like gratings. Here, the microstructures can recur in a very precisely definable grid.

Furthermore, the use of non-diffractive gratings for manufacturing the microstructures is conceivable, especially scattering grids such as matte-texture images.

However, metallized, embossed microstructures of this kind exhibit the disadvantage that, if the entire surface is metallized, light reflection possibly prevails that is similarly high in nearly all areas, and the contrast of the microstructures compared with the surrounding, non-embossed areas is thus not optimal.

Thus, to improve the contrast, besides or in addition to the hologram-like gratings, special surface structures can be used that selectively reduce the reflection properties of a metallized surface and thus convey a dark color impression (so-called diffractive black structures).

The principle layer structure of such a security element exhibiting microstructures will now be described in greater detail using the example of a security element 90 in FIG. 11, in which a microstructure arrangement having embossed microstructures 92, e.g. in the form of non-diffractive gratings is formed. The embossed microstructures 92 are embossed in an embossing lacquer layer 94, e.g. a UV lacquer layer, and disposed on a transparent carrier substrate 98, e.g. a PET film, in the same geometric arrangement as the lens arrangement 12. Here, the difference in the spatial frequency of the respective grid of the lens arrangement and the microstructure arrangement can be suitably selected to form a first authenticating feature.

Every one of the embossed microstructures 92 taken by itself forms one character or pattern each that is present in dimensions that correspond approximately to those of the microlenses of the lens arrangement 12. To increase the counterfeit protection, in the metal layer 95 applied to the embossed microstructures is further provided, as a second authenticating feature, an aperture 96, e.g. in the form of a motif. In addition, the metal layer 95 constitutes a conductive layer that can be machine verified.

The security element 90 according to the present invention shows, when viewed, an extremely magnified three-dimensional image of the microstructures 92 formed as non-diffractive gratings that exhibits a characteristic depth, as well as motion effects, and shows the non-diffractive gratings, e.g. as a series of magnified matte-texture images. The viewer can perceive the piece of information present as the aperture 96 superimposed on this image as a two-dimensional image.

According to an alternative variant of this exemplary embodiment, not shown here, the embossed microstructures 92 can be provided with a thin film structure rather than with a metal layer 95. In this way, a second authenticating feature is obtained in the form of an additional color shift effect.

If embossed microstructures of suitable embossing depths and structure widths are metallized obliquely, larger or smaller non-metallized areas are created, depending on the vapor deposition angle. The principle layer structure of a security element 100 according to the present invention and manufactured with such a method will now be described in greater detail with reference to FIG. 12.

The security element 100 differs from the above-described security elements according to the present invention in the development of the microstructure arrangement.

In this exemplary embodiment, the microstructure arrangement is present on a transparent carrier substrate 108, e.g. a PET film. Alternatively, the carrier substrate can also be colored. The microstructure arrangement exhibits a plurality of microstructures 106 embossed in an embossing lacquer 104, e.g. a UV lacquer. Here, the microstructures 106 are disposed in the same geometric arrangement as the microlenses of a lens arrangement 12, and exhibit furthermore a metal layer 105 that, through oblique vapor deposition of the microstructures, is only partially present thereon.

In addition, the security element 100 exhibits a second and, optionally, further authenticating features in the form of one or more machine-readable layers that includes/include machine-readable feature substances, for example magnetic, electrically conductive, polarizing, phase shifting, phosphorescent or fluorescent substances. Also the embossing lacquer layer 104 as such can include machine-readable feature substances. For example, luminescent substances can be added to the embossing lacquer 104.

Optionally, prior to applying an activatable adhesive layer 17 that serves to transfer the security element 100 to a security paper or to improve the adhesion of the security element in the paper, further layers, e.g. ink layers, can be applied to the carrier substrate 108.

In a further variant of this exemplary embodiment, not shown here, the microstructure arrangement is not joined with the lens arrangement 12 via an adhesive layer 11, as shown in FIG. 12. Rather, the microlenses of the lens arrangement 12 and the embossed microstructures 106 are disposed on opposing sides of the same carrier substrate.

FIG. 13 shows a further exemplary embodiment of the present invention, in which the microstructure arrangement of a security element 120 is formed by the interplay of a full-surface zero-order diffraction grating 126 (ZOG) with a microstructure arrangement in the form of printed, absorbing microscopic structures or microstructures 122.

The zero-order diffraction grating 126 is embossed in the form of rectangular structures in a layer 124, e.g. a UV lacquer layer, the embossed rectangular structures also being vapor deposited with a high-index layer, e.g. of ZnS or $TiO_2$. On the non-embossed, opposing surface of the layer 124, an arrangement of absorbing, e.g. black microstructures 122 is imprinted in a grid that corresponds in magnitude and geometric relationship to the grid of a lens arrangement 12 with which the microstructure arrangement is joined via an adhesive layer 11. The zero-order diffraction grating 126 shows a characteristic color shift effect only in the areas in which the absorbing microstructures 122 are present.

Adjoining the printed microstructures 122 can further be provided as a second authenticating feature another metal layer 125 that is present on a carrier substrate 128. Additionally, apertures 129 can be provided in the metal layer 125, e.g. in the form of a motif.

In FIG. 14 is shown a further exemplary embodiment of the present invention, in which the microstructure arrangement of a security element 130 exhibits embossed microstructures 136 that serve here as alignment or orientation structures for a layer comprised of liquid crystal material. By applying liquid crystal layers to orienting, embossed microstructures, it is possible to produce polarizing microstructure arrangements that can be made visible with the aid of simple verification devices, such as linear or circular polarizers.

The alignment layer 134 disposed on a carrier substrate 138 comprises, disposed in a grid, a plurality of embossed microstructures 136 on which the layer 132 disposed thereabove and comprised of e.g. nematic liquid crystal material is oriented. Alternatively, a microstructured layer manufactured by etching or scoring, or an appropriately exposed layer comprised of a linear photopolymer can also serve as the alignment layer for orienting liquid crystals.

In addition to the lens arrangement 12 that is present on a carrier substrate 14 and that is joined with the liquid crystal layer 132, for example via an adhesive layer 11, the security element 130 further exhibits a metal layer 135 as a second authenticating feature. This can optionally be furnished with apertures, for example in the form of a motif.

The embossed microstructures 136 are not perceptible with the naked eye. Viewed without auxiliary means, the security element has merely a shiny metallic appearance, where appropriate with apertures. The desired magnification effect appears only when the security element 130 is viewed through a polarizer.

The security element 130 then shows an extremely magnified three-dimensional image of the polarizing areas produced by the embossed microstructures 136 that exhibits a characteristic depth, as well as motion effects, the polarizing areas appearing as magnified characters or patterns.

According to a variant of this exemplary embodiment, not shown here, the verification device can also be integrated into the layer structure of the security element 130 itself. For example, a circular polarizer formed by a linear polarizer and a following $\lambda/4$ plate can be provided above or below the lens arrangement 12. In this case, the oriented liquid crystal layers are perceptible, without additional auxiliary means, in the form of a light-dark contrast.

According to a further variant, not shown here, the microlenses of the lens arrangement 12 and the alignment layer 134 having the embossed microstructures 136 are disposed on opposing sides of the same carrier substrate. Accordingly, the alignment layer 134 and the liquid crystal layer are present in reverse order.

A further method, not shown here, for manufacturing microscopic structures for a microstructure arrangement according to the present invention is known as microcontact printing (μCP). This permits even a resolution of less than 1 μm and is thus particularly suited for manufacturing very small, high-resolution, printed microscopic structures.

In this method, the microscopic structures are manufactured by means of semiconductor patterning techniques (photolithography, electron beam lithography, etching and lift-off methods, nanoimprint lithography, etc.) and subsequently molded with an elastomer (e.g. PDMS). In this way, a flexible, explicitly patterned stamp or impression cylinder is created that, when special printing inks and printing substrate surface treatment are used, is suited for the transfer of very thin ink layer thicknesses.

By applying a suitable ink with the aid of an impression cylinder manufactured in this way, it is possible to create printed microscopic structures having high resolution.

FIGS. 15 to 21 show further exemplary embodiments of the present invention, in which the microstructure arrangement comprises printed microscopic structures. The exemplary embodiment in FIG. 15 shows a security element 140 having a lens arrangement 12 disposed on a carrier substrate 14. On the reverse of the carrier substrate 14 are imprinted in a grid, for example with the aid of the above-described μCP method, microscopic structures or microstructures 142, the microstructures 142 being able to be present in the form of characters or patterns, e.g. as letters or logos. In addition, the printed microstructures 142 can comprise two or more patterns having different colors and/or in different line screens.

To the microstructures 142 of the microstructure arrangement is further applied, as a second authenticating feature, a reflecting metal layer 145 that exhibits apertures 146, e.g. in the form of a motif. Such security elements appear opaque in transmitted light. Only the apertures 146 are perceptible for the viewer. In addition, such a development offers the advantage that the metallization increases the optical brilliance of the printed microstructures.

Optionally, an opaque, e.g. white, ink layer 144 can be applied under the metal layer 145. Additionally or alternatively to the metal layer 145, the security element 140 can exhibit further authenticating features in the form of a (further) machine-readable layer that includes machine-readable feature substances, for example magnetic, electrically conductive, polarizing, phase-shifting, phosphorescent or fluorescent substances. Also the printed microstructures 142 as such can include machine-readable feature substances. For example, magnetic pigments or luminescent substances can be added to the printing ink.

Also in this exemplary embodiment, a slight difference in the spatial frequencies of the microlenses 112 and of the printed microstructures 142, which can be achieved through the above-described measures, serves to produce the desired moiré magnification effect. Accordingly, when viewed, the security element 140 shows an extremely magnified three-dimensional-appearing image of the printed microstructures 142. It exhibits a characteristic depth, as well as motion effects. Here, the microstructures 142 appear to the viewer e.g. as a magnified letter or logo string. Here, too, it must be taken into account that the magnification effect increases the smaller the difference is in the spatial frequencies of the lens arrangement and the microstructure arrangement. Superimposed on this magnified image, the viewer perceives the apertures 146 in the metal layer 145 as a two-dimensional image, e.g. a text, in original size.

If the printed microstructures 142 are additionally or alternatively manufactured with luminescent inks, the above-described magnification effects appear also or only upon irradiation with radiation that excites the luminescent substances, e.g. with ultraviolet radiation.

According to an alternative development of this exemplary embodiment, the printed microstructures 142 of the microstructure arrangement and the microlenses 112 of the lens arrangement 12 can also be present in a substantially identical line screen without the individual grids being rotated against one another. For this, the microstructures 142 of the microstructure arrangement are printed exactly in the line screen of the microlenses of the lens arrangement 12. In this way, it is possible to achieve flip image effects. Here, the extremely strong magnification effect is used that occurs when a grid comprised of identical microstructures is viewed through a lens arrangement having a substantially identical line screen. This can be explained as follows. If such a system comprised of microstructures and microlenses precisely oriented toward each other and having identical line screens is viewed from a certain viewing direction, each microlens forms the respective identical point of the microstructure lying thereunder, thus virtually forming an infinite magnified image of the underlying microstructure point. If the viewing direction changes, a corresponding other point of the microstructure appears to the viewer in the corresponding magnification. In this way, a so-called "flash" image, for example, can be produced. This is understood to be an image in which the image information is visible for a viewer only from a certain viewing direction, while the image information is not perceptible from all other directions. In other words, for a viewer, when the viewing direction changes, the image emerges apparently from nowhere and likewise disappears again.

According to a further embodiment of a security element 200 according to the present invention, shown in FIG. 20, the metallization provided by the reflecting metal layer 145 in FIG. 15 can also be provided by a vapor deposited thin film structure 207 as a second authenticating feature. The thin film structure 207 is composed of an absorber layer 204, a dielectric spacing layer 205 and a reflection layer 206, the reflection layer 206 being able, where appropriate, to exhibit apertures. Otherwise, the structure of the security element 200 depicted in FIG. 20 corresponds substantially to that of the security element 140 in FIG. 15.

Prior to applying an activatable adhesive layer 17 that serves to transfer the security element 100 to a security paper or to improve the adhesion of the security element in the paper, optionally, further layers 209, e.g. ink layers, can be applied to the security element 200.

In addition to the full-surface embodiment shown, variants in which the lens arrangement 12, the microstructure arrangement 202 and the individual layers of the thin film structure 207 are applied only on part of the surface are also conceivable.

Instead of a thin-film element as schematically depicted in FIG. 20, color shifting effect inks can be used areally, allowing areally different color shift effects to be achieved that furthermore are visible from both sides.

In addition to the full-surface embodiments shown, further variants are conceivable in which the microlenses of the lens arrangement, the printed microstructures of the microstructure arrangement and the reflecting layer are not present across the entire surface.

For example, in security element areas in which the lens arrangement 12 exhibits no microlenses 112, instead of a reflecting metal layer, a diffraction grating can be provided. Such a development is shown in FIG. 22.

The security element 220 depicted in FIG. 22 corresponds in structure substantially to the security element 140 in FIG. 15. Here, however, to further increase the counterfeit protection, a diffraction grating 224, for example an embossed hologram, is provided that is embossed in areas in the reflecting metal layer 245 that are not superimposed by the microlenses of the lens arrangement 12. Now, in addition to the moiré magnification effect produced by the lens arrangement 12 in coaction with the printed microstructures 242 of the microstructure arrangement, a viewer additionally perceives the optically variable effect of the quasi-embedded embossed hologram.

Variants are also conceivable in which the metal layer providing the second authenticating feature is not applied to the microstructure arrangement, but rather to the profiles of focussing, especially lens-shaped elements. With such an arrangement comprised of micro-concave reflectors, it is possible to achieve similar effects as with the lens arrangement 12 shown in the preceding figures.

In such a layer structure, the microstructure arrangement normally includes opaque and transparent elements, for example microstructures printed on a transparent carrier substrate. Incident light passes through the transparent areas onto the concave reflector arrangement and is reflected there through the plane of the microstructure arrangement, which is magnified according to the above-explained principle. In addition to such a moiré magnification effect, the security element shows a characteristic depth or a three-dimensional appearance, as well as motion effects. Here, too, the viewer perceives only the floating magnified image, but not the microstructures, which are present in dimensions below the resolution limit of the human eye.

Such an embodiment will now be explained in greater detail using the example of a security element 150 developed as a transfer element, shown in FIG. 16. The transfer element 150 can be transferred to a security paper or value document in a transfer process. Here, the series of layers on a carrier substrate 158 is structured such that the adhesion on the carrier substrate is relatively low. For this, in individual cases, release or separation layers 159 can be applied on the carrier substrate 158. An adhesive layer 157 is then applied to the security element 150 and the security element transferred to the security paper or value document. The carrier substrate 158 is generally removed.

However, the transfer element 150 can also be formed such that it adheres well to the carrier substrate 158. In this case, the carrier substrate remains on the security element following the transfer. With a security element developed in this way, it is possible, for example, to span transparent or free-standing areas and especially windows present in the security paper. Depending on the design of the security element, where appropriate, different optical appearances are then visible on both sides.

Optionally, prior to application of the adhesive layer 157, the security element can also be provided with a protective layer, not shown here.

Instead of a lens arrangement having microlenses, the transfer element 150 depicted in FIG. 16 exhibits a concave reflector arrangement 152 having a plurality of lens-shaped elements or lens structures that are embossed in a film and that are disposed in a grid having a fixed geometry, e.g. in a hexagonal grid. Alternatively, the concave reflector arrangement can be embossed in a moldable embossing lacquer layer, which is applied on a carrier substrate. For metallization, the profiles of the lens structures of the concave reflector arrangement 152 are provided with a reflecting metal layer 155 that is e.g. vapor deposited. In contrast to the refractive microlenses, the optical properties of concave reflectors change only marginally upon embedding.

Furthermore, apertures 156 in the form of characters or patterns can, according to one of the above-described methods, also be introduced into the metal layer 155 providing the second authenticating feature.

Alternatively, instead of the metal layer 155, a layer comprised of high-index material, a screened or a very thin, semi-transparent metal layer can be provided. In this way, it is possible to realize especially embodiments in which the perceptibility of further authenticating features should be guaranteed, e.g. printed images that lie behind the reflective coating when viewed from a direction 160. The transfer element 150 then exhibits, where appropriate, as a second authenticating feature, a machine-readable layer that includes machine-readable feature substances, for example magnetic, electrically conductive, polarizing, phase shifting, phosphorescent or fluorescent substances. The machine-readable feature substances can also be included in the layer comprised of high-index material. Also the printed microstructures 154 as such can include machine-readable feature substances. For example, magnetic pigments can be added to the printing ink.

According to a further alternative variant of this exemplary embodiment, not shown here, the reflective coating can also be provided by a vapor deposited thin film structure. In this way, a second authenticating feature is obtained in the form of an additional color shift effect.

Here, the thin film structure can be applied to the lens structures, on one hand in the sequence lens structures, absorber layer, dielectric spacing layer, reflection layer, or in the sequence lens structures, reflection layer, dielectric spacing layer, absorber layer, with further apertures being able to be provided in the reflection layer. In the first case, concave reflector arrangements are obtained that are furnished with a color shifting, reflecting layer. In the second case, a shiny metallic, reflecting concave reflector arrangement is obtained, a viewing-angle-dependent color shift effect additionally being able to be perceived when the security element is viewed from the other side.

On the non-embossed surface of the layer exhibiting lens structures is imprinted, in a grid, an arrangement of substantially opaque microstructures 154 that corresponds in magnitude and geometric relationship to the grid of the concave reflector arrangement 152. Here, the printed microstructures 154 lie in the focal plane of the concave reflector. The distance from the concave reflector vertex to the plane of the microstructures is equal to half the radius of curvature of the (spherical) concave reflector.

A protective layer can be provided on both the arrangement of the printed microstructures 154 and on the reverse of the concave reflector arrangement 152.

Furthermore, as depicted in FIG. 16, the transfer element 150 can comprise as a further authenticating feature, also beside and/or between the lens structures of the concave reflector arrangement 152, an embossed diffractive or scattering structure 164, e.g. an embossed hologram or a matte structure. The embossed structure 164 can likewise be furnished with the metal layer 155. Apertures 156 can, where appropriate, be present therein.

Interesting effects can also be achieved when, instead of a single combination of a lens arrangement with a microstructure arrangement, such a combination is provided on both sides of the security element. Here, it is possible to achieve particularly interesting effects if lens arrangements having different line screens are used. Such security elements can preferably be employed as security threads that appear on both sides of a security paper or value document, or for transfer elements that come to lie over transparent or free-standing areas.

Referring to FIG. 17, such an embodiment will now be described in greater detail by reference to the security element 170, which corresponds in structure substantially to the security element in FIG. 15. Here, however, the security element depicted in FIG. 15 is further present quasi-mirrored. In particular, on both sides of the security element, lens arrangements 12, 172 are provided, the lens arrangement 172 additionally being disposed on a carrier substrate 178. It is obvious that, alternatively or additionally, also the lens arrangement 12 can be disposed on a carrier substrate.

Furthermore, the security element 170 comprises printed microstructures 174, 176, the microstructures 176 being present substantially only in the areas provided with an opaque metal layer 175. In this way, the moiré magnification effect according to the present invention for the microstructures 176 can be made visible only with the aid of the lens arrangement 172. The magnification effect for the microstructures 174, on the other hand, with suitable selection of the microlenses of the respective lens arrangement 12, 172, can be perceived from both sides, at least areally, where appropriate with different magnification effect.

Here, the metal layer 175 is provided only in some areas, e.g. in the form of a motif, between the microstructures 174 and the microstructures 176, and in this way provides a second authenticating feature in the form of a visually verifiable, concrete piece of information that, in addition, allows machine verification.

The structure of a security element according to the present invention in a further development will now be described in greater detail with reference to FIG. 18. Here, FIG. 18 (a) depicts a cross-section through a security element 180 according to the present invention, and FIGS. 18 (b) and (c) show top views of special embodiments of the printed microstructures of this security element.

The layer structure shown in FIG. 18 (a) facilitates the realization of a flip image effect and especially a color shift effect that is described in detail above. In the exemplary embodiment, under the microlenses of a lens arrangement 12, microstructures 182 having alternating different colors in the line screen of the microlenses are imprinted in perfect register, creating a viewing-angle-dependent color shift effect. Either the one or the other microstructures 182 are visible through the lenses, depending on the viewing angle.

On a carrier substrate 188 is further provided a reflecting metal layer 185 as a second authenticating feature. Therein are provided further apertures 183, e.g. in the form of a motif, to increase the counterfeit protection.

Optionally, prior to application of an activatable adhesive layer 17 that serves to transfer the security element 180 to a security paper or to improve the adhesion of the security element in the paper, further layers, e.g. ink layers, can be applied to the carrier substrate 188.

If the printed microstructures are adapted to the base area of the microlenses of the lens arrangement 12 in the manner shown in FIGS. 18 (b) and (c), it is possible to achieve the effects described in the following.

Through the arrangement of differently colored areas in concentric circles in the microstructure arrangement 184 (FIG. 18 (b)) that is adapted to the circular base area of e.g. a spherical microlens, the color shift effect occurs when the security element 180 is tilted accordingly, independent of the viewing direction.

Through the differently colored microstructures, disposed as grid points, of the microstructure arrangement 186 in FIG. 18 (c), e.g. a color shift effect from green to red can be achieved when tilted from east to west, and a color shift effect from green to blue when tilted from north to south.

The arrangement of the colored areas in the microstructures can be solved in widely varying ways. For example, microstructure arrangements are also conceivable in which the arrangement of the differently colored areas in the microstructures is provided by circle segments or lines.

According to a variant of this exemplary embodiment, a viewing-angle-dependent color shift effect under ultraviolet radiation can be achieved in that the microstructures are printed with two or more different luminescent inks. Viewed without auxiliary means, the security element then exhibits merely a shiny metallic appearance, where appropriate with apertures. The desired color shift effect appears, on the other hand, only when the security element is irradiated with e.g. UV radiation.

In contrast to conventional color shift effects as can be created by means of interference in thin-film elements or with liquid crystals, which always exhibit a defined sequence of consecutive colors, the color shift effects created with the aid of the microlenses are freely selectable. With these, it is possible to create substantially any color shift effect, i.e. any color A can shift to any color B.

Of course such color shift effects can also be combined with the above-described magnification effects. For this, the microstructures are disposed in certain areas in perfect register with the microlenses of the lens arrangement, while in other areas they are present in a different spatial frequency compared with the lens arrangement.

The security element 190 according to the present invention, shown in FIG. 19, corresponds in structure substantially to the security element 140 in FIG. 15. In addition to a lens arrangement 192 that is disposed on a carrier substrate 194, it comprises a microstructure arrangement 196 that exhibits, for example, printed microstructures, as well as, present on a carrier substrate 198, a metal layer 195 that, where appropriate, includes apertures and provides the second authenticating feature.

Furthermore, beside or between the microlenses of the lens arrangement 192 is provided an embossed diffractive or scattering structure 199, e.g. eine matte structure or an embossed hologram, to which, where appropriate, a metal layer is applied. The application of a metal layer to the embossed structure 199 has the advantage that it is particularly easy to see. To realize transparent variants, it is conceivable to replace the cited metal coating with high-index layers, e.g. comprised of ZnS or $TiO_2$.

Through appropriate manufacturing methods, it is possible to place diffractive or scattering structures directly beside corresponding lens arrangements. Alternatively, the microlenses of the lens arrangement or, where appropriate, the metallized concave reflector arrangements and the diffractive or scattering structures described in FIG. 16 can also be superimposed.

Instead of embossed diffractive or scattering structures, zero-order diffraction gratings can also be provided areally, beside a lens arrangement or in superimposition therewith. Ideally, these are further vapor deposited with a high-index layer, e.g. comprised of ZnS, $TiO_2$. Then, in the area in which the zero-order diffraction gratings lie, a color impression is obtained that changes when the security element is rotated.

A further development of a security element 210 according to the present invention will now be described in greater detail with reference to FIG. 21. In addition to a lens arrangement 12 disposed on a carrier substrate 14, the security element 210 comprises an arrangement having printed microstructures 212 and a metal layer 215.

Further, between the microstructure arrangement 212 and the metal layer 215 is provided a layer 214 comprised of liquid crystal material, e.g. of cholesteric liquid crystal material, as well as a dark, e.g. black, ink layer 216 that, where appropriate, is present areally. Optionally, the dark ink layer 216 can additionally include machine-readable feature substances, e.g. magnetic substances. The metal layer 215 can, as depicted in FIG. 21, be present only areally, where appropriate in perfect register with the dark ink layer 216, or as a semitransparent or screened metal layer. In addition to the above-described moiré magnification effect, such an arrangement also causes a color shift or polarization effect. Both the metal layer 215 and the combination of dark ink layer 21 and the layer 214 comprised of liquid crystal material can thus provide a second authenticating feature within the meaning of the present invention.

Optionally, prior to application of an activatable adhesive layer 17 that serves to transfer the security element 100 to a security paper or to improve the adhesion of the security element in the paper, further layers 219, e.g. ink layers, can be applied to the security element 210.

In addition to the full-surface development shown, variants are also conceivable in which lens arrangement 12, the microstructure arrangement 212 and the liquid crystal layer 214 or the dark ink layer 216 are applied only on parts of the surface. In addition, the above-described layer structure 214, 216 can also be applied, instead of a metal layer, to the profiles of the lens structures of a concave reflector arrangement.

It is understood that, instead of the microlenses described in the above exemplary embodiments, other elements having a light focussing effect can also be used. In addition, the security elements according to the present invention can be combined with further layers, especially with further machine-readable layers. Such layers include, for example, reflecting, magnetic, electrically conductive, polarizing, phase shifting and luminescent substances.

To hide magnetic layers, they are, ideally, embedded between two opaque layers. If metallized areas are already present on the security element, the magnetic layer can be transferred to them, for example, with the aid of an adhesion promoter layer. Thereafter, the magnetic layer can be masked by means of a further metal layer, an opaque ink layer having high optical density, or a layer that includes e.g. metal pigments. The magnet areas can be present as continuous areas along the security element or in the form of a code.

The electrical conductivity can be achieved e.g. through a continuous metal layer. Since the stability of metal layers with respect to mechanical loads is often insufficient, alternatively or additionally, substantially transparent, electrically conductive coatings can be applied to the entire surface or to areas of the surface of the security element. These layers have the advantage that they do not disrupt the optical appearance of the security element.

However, colored and/or shiny metallic coatings can also be used. When printing inks with carbon black pigments are used, a layer manufactured therewith is preferably embedded between two opaque layers in the security element to avoid spoiling the appearance of the security element.

In addition, luminescent, especially fluorescent or phosphorescent, substances can be employed at any location in the layer structure of the security element according to the present invention. In particular, such substances can be introduced into the microlenses or lens structures of concave reflectors. The microlenses or lens structures are relatively thick compared with customary printing inks (several micrometers) and thus offer sufficient room for such substances. Here, however, it must be borne in mind that the luminescent substances should be substantially optically transparent.

According to a further development, a security element according to the present invention can also be combined with a layer that exhibits phase shifting properties. For this, the security element is partially coated, e.g. with a layer comprised of liquid crystal material that exhibits these properties. In particular, metallized areas are either partially coated with oriented liquid crystals, in the form of printed patterns, or the entire surface of the security element is coated with liquid crystals that exhibit a double-refracting property and whose main axes lie areally in different directions. In this way, by applying circular or linear polarizers, an otherwise invisible pattern can be revealed.

Alternatively, a security element can also be coated with polarizing substances such as cholesteric liquid crystal material.

We claim:
1. A security element for securing valuable articles, having at least one first authenticating feature, the first authenticating feature comprising a first arrangement, having a plurality of lens-shaped focusing elements that are present in a first grid, and a second arrangement, having a plurality of microscopic structures that are present in a second grid, the first and the second arrangement being disposed in such a way that the spatial frequencies of the two grids differ slightly and, as a result of a moiré effect, the microscopic structures of the second arrangement are seen magnified when viewed through the lens-shaped focusing elements of the first arrangement, and
a second authenticating feature that is visually verifiable and is not magnified by the first arrangement of the first authenticating feature,
wherein the microscopic structures of the second arrangement of the first authenticating feature comprise embossed microstructures that are coated with a metal reflection layer that provides the second authenticating feature and that exhibits apertures in the form of characters, patterns or codes, and/or is present in the form of characters, patterns or codes,
and wherein the magnification effect of the lens-shaped focusing elements of the first arrangement does not relate to the second authenticating feature.

2. The security element according to claim 1, characterized in that the first grid and second grid of the first authenticating feature exhibit fixed geometric relationships.

3. The security element according to claim 1, characterized in that the first grid and the second grid of the first authenticating feature exhibit a slightly different line screen spacing.

4. The security element according to claim 1, characterized in that the first grid and the second grid of the first authenticating feature exhibit a substantially identical line screen spacing and are disposed slightly rotated toward one another.

5. The security element according to claim 1, characterized in that the line screen spacing of the first and second grid lies between approximately 3 µm and approximately 50 µm.

6. The security element according to claim 1, characterized in that the second authenticating feature comprises a machine-readable layer.

7. The security element according to claim 6, characterized in that the machine-readable layer includes machine-readable feature substances, especially reflecting, magnetic, electrically conductive, polarizing, phase shifting, phosphorescent, fluorescent or other luminescent substances.

8. The security element according to claim 1, characterized in that the first and second arrangement of the first authenticating feature are disposed in such a way that the focusing elements of the first arrangement and the embossed microstructures of the second arrangement are developed as elevations that point in the same direction.

9. The security element according to claim 1, characterized in that the embossed microstructures comprise elements that are present in the form of spherical or aspherical caps, cones, triangular pyramids, trapezoidal pyramids, truncated cones, truncated pyramids or the like, and/or exhibit a base area in the form of characters, patterns or codes.

10. The security element according to claim 1, characterized in that the embossed microstructures are embossed in a colored embossing lacquer.

11. The security element according to claim 10, characterized in that the colored embossing lacquer is a radiation-curing lacquer containing color pigments.

12. The security element according to claim 1, characterized in that the embossed microstructures are disposed on a colored carrier substrate.

13. The security element according to claim 10, characterized in that the embossed microstructures on the structured side of the second arrangement are provided with an opaque coating.

14. The security element according to claim 1, characterized in that the lens-shaped focusing elements of the first arrangement and the embossed microstructures of the second arrangement exhibit circular or elliptical base areas.

15. The security element according to claim 1, characterized in that the first arrangement comprises a combination of lens-shaped focusing elements of differing size and line screen spacing.

16. The security element according to claim 1, characterized in that the lens-shaped focusing elements of the first arrangement and/or the microscopic structures of the second arrangement are disposed on a carrier substrate.

17. The security element according to claim 1, characterized in that a spacing layer and/or an adhesive layer is provided between the lens-shaped focusing elements of the first arrangement and the microscopic structures of the second arrangement.

18. The security element according to claim 1, characterized in that the lens-shaped focusing elements of the first arrangement are provided with a protective layer, the protective layer exhibiting a refractive index that differs from the refractive index of the lens-shaped focusing elements by at least 0.3.

19. The security element according to claim 1, characterized in that the security element exhibits a total thickness of less than 50 μm.

20. The security element according to claim 1, characterized in that the security element is a security thread, a tear strip, a security band, a security strip, a patch or a label for application to a security paper, value document or the like.

21. The security element according to claim 1, wherein the second authenticating feature is machine and visually verifiable.

22. The security element according to claim 5, wherein the line screen spacing is between approximately 5 μm and approximately 35 μm.

23. The security element according to claim 5, wherein the line screen spacing is between approximately 10 μm and approximately 20 μm.

* * * * *